(12) United States Patent
Elcock et al.

(10) Patent No.: US 10,945,230 B2
(45) Date of Patent: Mar. 9, 2021

(54) SYSTEM AND METHOD FOR AUTOMATIC REDIRECTION OF WIRELESS CLIENT TO NEARBY WIRELESS HOTSPOT DEVICE

(71) Applicant: ARRIS Enterprises LLC, Suwanee, GA (US)

(72) Inventors: Albert F. Elcock, West Chester, PA (US); Christopher S. Del Sordo, Souderton, PA (US); Charles Hardt, Lawrenceville, GA (US)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 16/228,750

(22) Filed: Dec. 20, 2018

(65) Prior Publication Data

US 2020/0205114 A1 Jun. 25, 2020

(51) Int. Cl.
| | |
|---|---|
| *H04W 64/00* | (2009.01) |
| *H04W 16/26* | (2009.01) |
| *H04W 36/32* | (2009.01) |
| *H04W 60/04* | (2009.01) |
| *H04L 12/24* | (2006.01) |

(52) U.S. Cl.
CPC ....... *H04W 64/003* (2013.01); *H04L 41/0816* (2013.01); *H04W 16/26* (2013.01); *H04W 36/32* (2013.01); *H04W 60/04* (2013.01)

(58) Field of Classification Search
CPC ... H04W 64/003; H04W 16/26; H04W 36/32; H04W 60/04; H04L 41/0816
See application file for complete search history.

(56) References Cited

U.S. PATENT DOCUMENTS

| | | | | |
|---|---|---|---|---|
| 2004/0259547 | A1* | 12/2004 | Lau | .......................... H04Q 7/20 |
| 2009/0248840 | A1 | 10/2009 | Garg et al. | |
| 2010/0248720 | A1* | 9/2010 | Millet | ...................... H04W 4/00 |
| 2012/0020307 | A1 | 1/2012 | Henderson et al. | |
| 2015/0237567 | A1* | 8/2015 | Xue | ...................... H04W 48/16 |

(Continued)

FOREIGN PATENT DOCUMENTS

| | | |
|---|---|---|
| EP | 2 288 208 | 2/2011 |
| EP | 2 725 761 | 4/2014 |

OTHER PUBLICATIONS

International Search Report dated Mar. 23, 2020 in International (PCT) Application No. PCT/US2019/067864.

*Primary Examiner* — Ronald B Abelson
(74) *Attorney, Agent, or Firm* — Wenderoth, Lind & Ponack, L.L.P.

(57) ABSTRACT

A wireless network gateway redirects a wireless client device to a wireless network hotspot device. The wireless network gateway includes a hotspot location determining component, a client location determining component, a redirecting component and a communication component. The hotspot location determining component determines the location of the wireless network hotspot device. The client location determining component determines the location of the wireless client device. The redirecting component generates a redirection instruction based on the location of the wireless network hotspot device and the location of the wireless client device. The communication component transmits the redirection instruction to the wireless client device to instruct the wireless client device to redirect to the wireless network hotspot device.

13 Claims, 15 Drawing Sheets

(56) References Cited

U.S. PATENT DOCUMENTS

2015/0358903 A1* 12/2015 Onaka .................. H04W 52/02
2018/0359696 A1* 12/2018 Borean ................. H04W 48/20
2018/0359764 A1   12/2018 Ong et al.

* cited by examiner

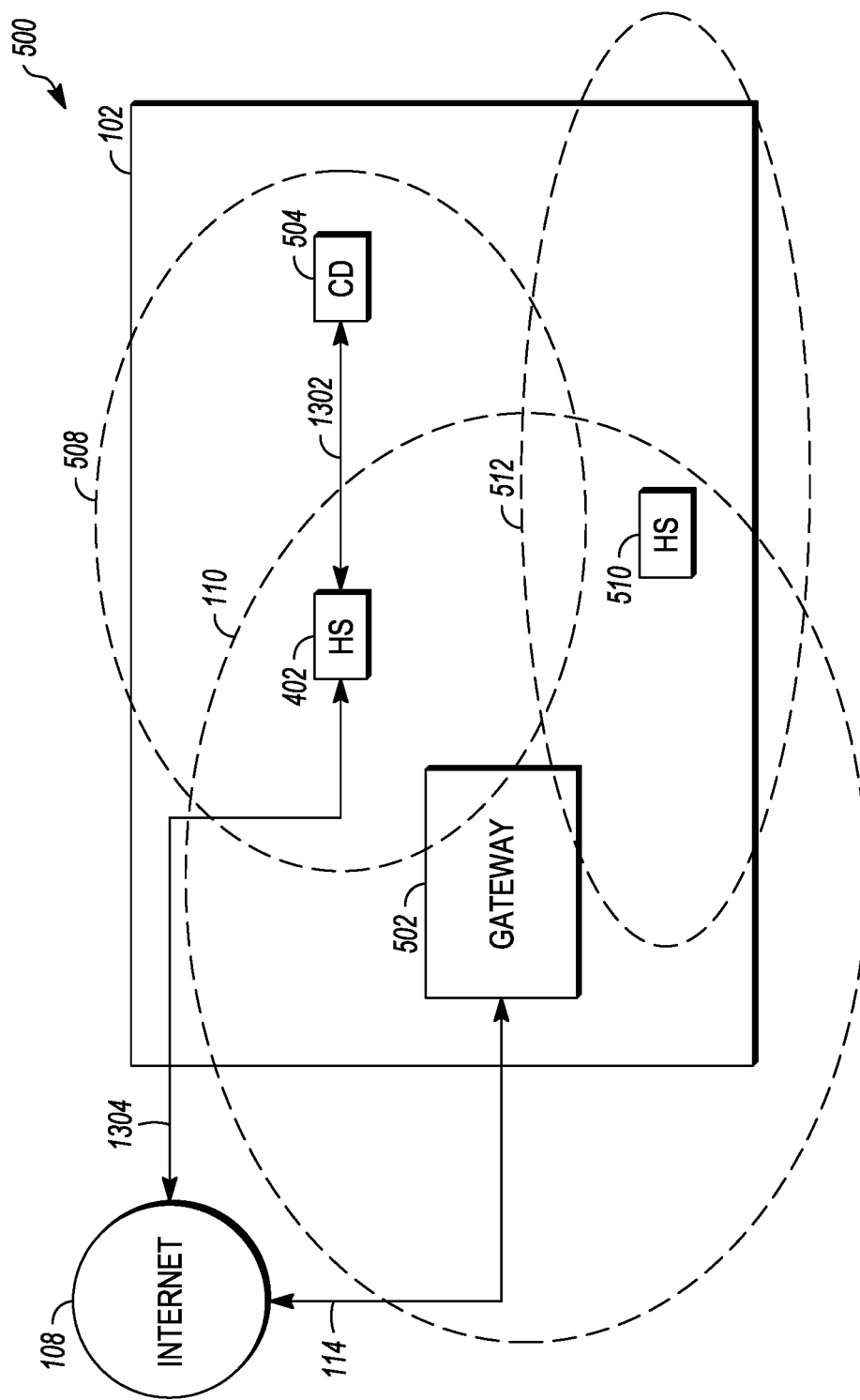

US 10,945,230 B2

SYSTEM AND METHOD FOR AUTOMATIC REDIRECTION OF WIRELESS CLIENT TO NEARBY WIRELESS HOTSPOT DEVICE

BACKGROUND

Embodiments of the invention relate to devices and methods of wireless network communication.

Many wireless network consumers experience dead zones which are locations in their house where availability of a wireless network (such as Wi-Fi) inexplicably seems to disappear. With all the devices, metal appliances, and architectural interference in the average home, even a fast and powerful Wi-Fi router can miss a few spots. Wi-Fi range extenders, also called Wi-Fi boosters, are a way to bring dead zones to life. The use of such extenders increases consumer cost, as well as increasing consumer effort due to the added complexity of setting up the devices. Moreover, in some scenarios, the need to increase the wireless "cloud of connectivity" exactly where it is needed may be temporary; for example, when hosting a large party in the backyard. Also, changes over time to consumer premises can alter Wi-Fi coverage needs and reconfiguration may be necessary.

SUMMARY

Aspects of the present disclosure are drawn to a system and method automatically sensing when a wireless network router (such as a Wi-Fi router) is not providing adequate coverage for a wireless network client (such as a Wi-Fi client), and redirecting the affected client to a device that already exists in the consumer's home that can provide alternate Internet access.

An illustrative embodiment of an aspect of the present disclosure is drawn to a wireless gateway for redirecting a wireless client device to a wireless hotspot device. The wireless gateway includes a wireless hotspot location determining component, a client location determining component, a redirecting component and a communication component. The wireless hotspot location determining component determines the location of the wireless hotspot device. The client location determining component determines the location of the wireless client device. The redirecting component generates a redirection instruction based on the location of the wireless hotspot device and the location of the wireless client device. The communication component transmits the redirection instruction to the wireless client device to instruct the wireless client device to redirect to the wireless hotspot device. The communication component may additionally transmit the redirection instruction to the wireless client device to instruct the wireless client device to redirect to the wireless hotspot device when the wireless client loses its current connection to the wireless router/Internet.

BRIEF SUMMARY OF THE DRAWINGS

The accompanying drawings, which are incorporated in and form a part of the specification, illustrate examples of embodiments and, together with the description, serve to explain the principles of the invention. In the drawings:

FIG. 13 illustrates the wireless communication system of FIG. 5, in accordance with aspects of the present disclosure at time $t_4$;

DETAILED DESCRIPTION

What is needed is an automated approach to sense when the Wi-Fi router is not providing adequate coverage for a Wi-Fi client and redirect the affected Wi-Fi client to a device that already exists in the consumer's home that can provide alternate Internet access.

Prior art wireless communications systems will now be described with reference to FIGS. 1-4.

Figure 1:
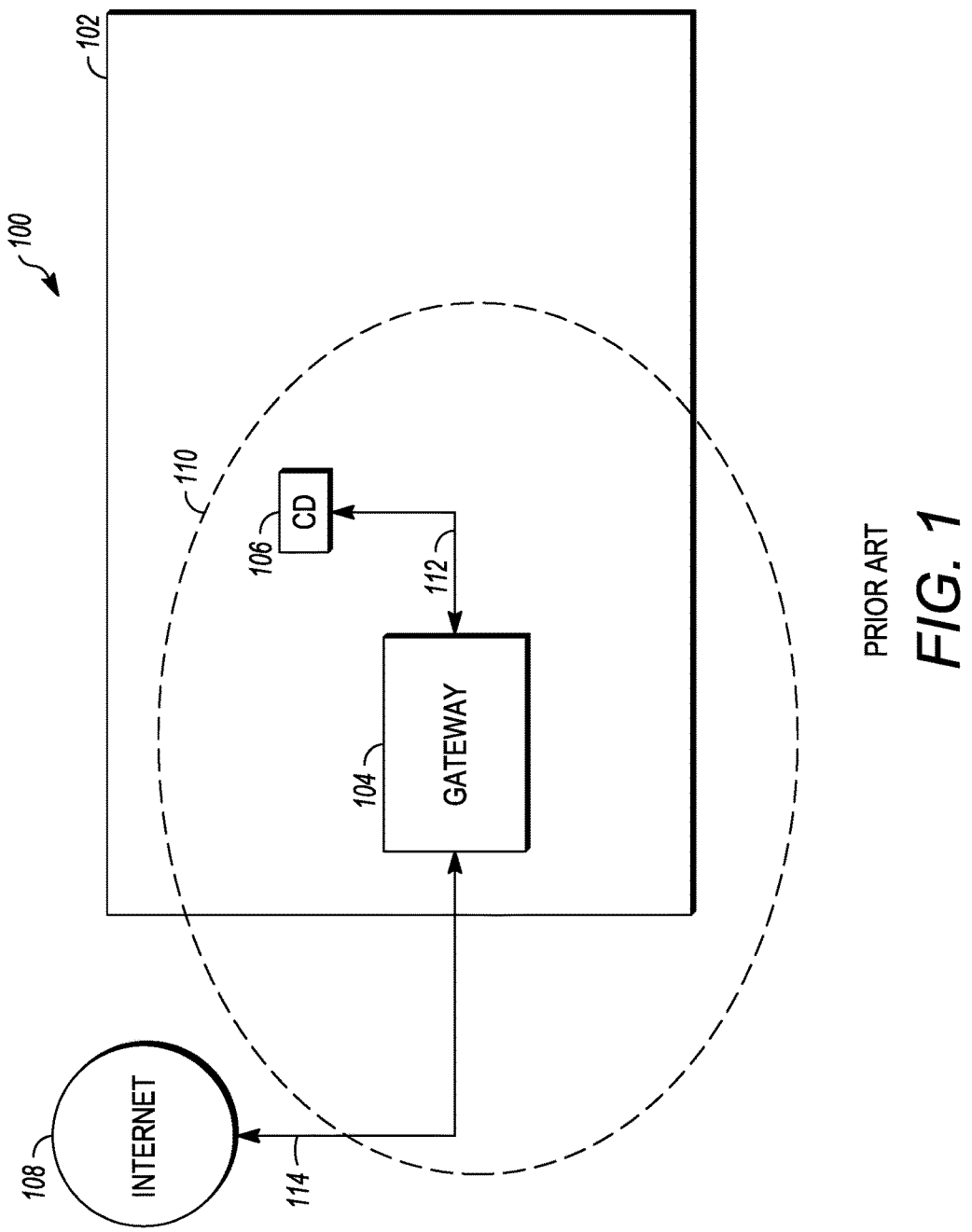
FIG. 1 illustrates an example of a prior art wireless communication system at a time $t_1$.

FIG. 1 illustrates an example of a prior art wireless communication system 100 at a time $t_1$.

As shown in the figure, wireless communication system 100 includes a house 102, a gateway 104, a Wi-Fi client device 106 and the Internet 108.

Gateway 104 and Wi-Fi client device 106 are disposed within house 102. Wi-Fi client device 106 is disposed within a Wi-Fi network 110 established by gateway 104. Gateway 104 is in communication with Wi-Fi client device 106 via a wireless communication channel 112 supported by Wi-Fi network 110 and is in communication with Internet 108 via a communication channel 114.

Gateway 104 may be any device or system that is operable to allow data to flow from one discrete network to another (or from Internet 108 in figure to Wi-Fi network 110 in the figure). Gateway 104 may perform such functions as link layer and physical layer outroute coding and modulation (e.g., DVB S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Wi-Fi network 110 and Internet 108 generally employ a layered protocol (e.g., make use of what are sometimes called protocol stacks or layered protocols (e.g., the Open Systems Interconnection (OSI) model). Networks generally employ such layered network protocols to accommodate a vast diversity of systems and physical devices (e.g., diverse platforms, such as computers running various operating systems, smart phones, entertainment systems, etc., and diverse forms of physical connection such as various types of wired connections, wireless connections, fiber optics, etc.). In a layered protocol, each layer is responsible for a particular kind of functionality, and each layer depends on the layers below it for other functions and provides services to the layers above it. In accordance with such a layered system, a given service can be used by multiple versions of the layer above it, and can make use of multiple versions of the layer below it. For example, in view of current large and complex systems that are constantly being updated, the layered protocol provides for the ability to change the implementation of a service without affecting other components of the system, and also different services can be implemented at each layer and can be modified or replaced without affecting the services of the other layers.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

A "gateway" as used herein is a gateway having wireless router capabilities. A wireless router is a device that performs the functions of a gateway and also includes the functions of a wireless access point. It is used to provide access to the Internet or a private computer network.

Gateway 104 is operable to establish and manage Wi-Fi network 110.

Wi-Fi client device 106 may be any device or system that is operable to wirelessly communicate with gateway 104 using the Wi-Fi standard.

In operation, Wi-Fi client device 106 is able to access Internet 108 by way of wireless network 110, so long as Wi-Fi client device 106 remains physically located within wireless network 110 to maintain communication channel 112.

At some time the Wi-Fi client device 106 may end up leaving Wi-Fi network 110. This will further be described with reference to FIG. 2 below.

Figure 2:
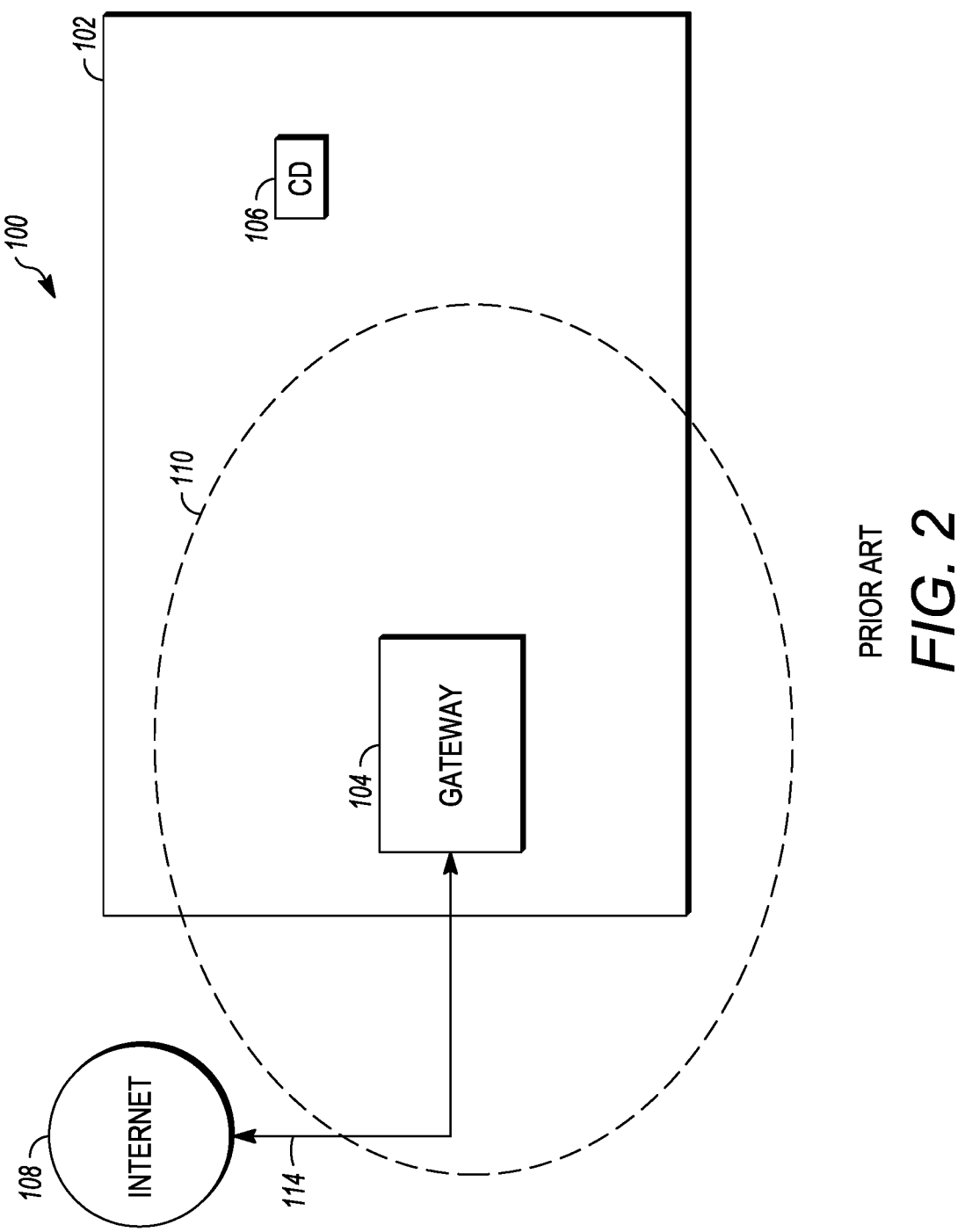
FIG. 2 illustrates the wireless communication system of FIG. 1 at a time $t_2$.

FIG. 2 illustrates wireless communication system 100 at a time $t_2$.

As shown in the figure, Wi-Fi client device 106 has moved outside Wi-Fi network 110. Accordingly, Wi-Fi client device 106 and gateway 104 are no longer in communication. Therefore, Wi-Fi client device 106 is unable to access Internet 108 via gateway 104.

In order to compensate for Wi-Fi client device 106 leaving Wi-Fi network 110, extending devices may be used to extend the range of Wi-Fi network 110. This will further be described with reference to FIG. 3 below.

Figure 3:
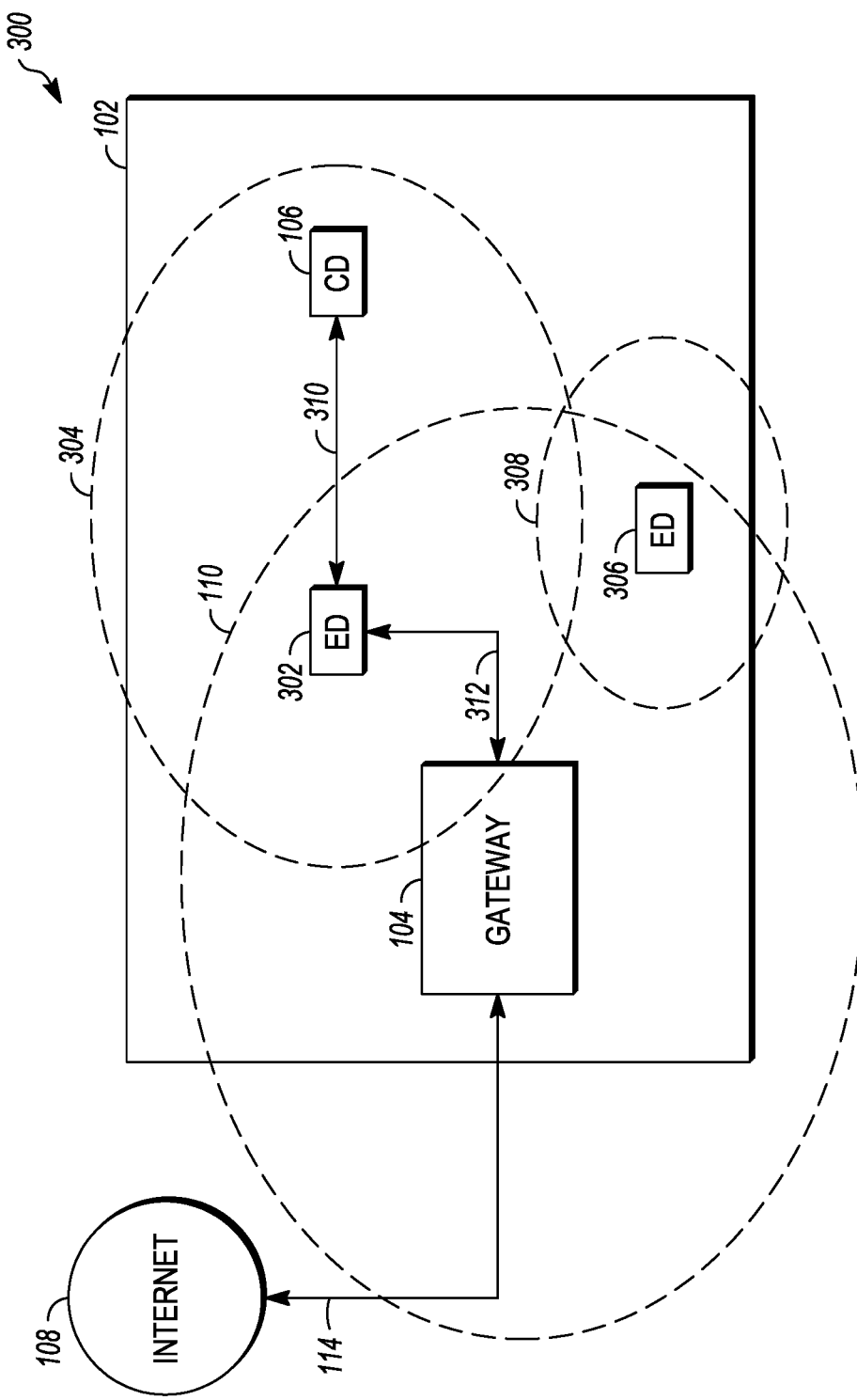
FIG. 3 illustrates another example of a prior art wireless communication system.

FIG. 3 illustrates another example of a prior art wireless communication system 300.

Wireless communication system 300 is similar to wireless communication system 100, but wireless communication system 300 includes an extender device 302 and an extender device 306.

As shown in the figure, extender device 302 and extender device 306 are disposed within Wi-Fi network 110, Wi-Fi client device 106 is disposed within a network extension 304. Gateway 104 is in communication with extender device 302 via a wireless communication channel 312 supported by Wi-Fi network 110, and Wi-Fi client device 106 is in communication to extender device 302 via a communication channel 310.

Extender device 302 and extender device 306 may be any device or system that is operable to wirelessly extend Wi-Fi network 110. In this example, extender device 302 provides a Wi-Fi network extension 304, whereas extender device 306 provides a Wi-Fi network extension 308.

Extender device 302 enables a client device 106 to communicate with gateway 104, even if the client device is outside of Wi-Fi network 110, so long as the client device is within Wi-Fi network extension 304. Similarly, extender device 306 enables a client device to communicate with gateway 104, even if the client device is outside of Wi-Fi network 110, so long as the client device is within Wi-Fi network extension 304. In this example, extender device 302 enables client device 106 to communicate with gateway 104, as client device is outside of Wi-Fi network 110, but is within Wi-Fi network extension 304.

A problem with using extending devices to extend the reach of Wi-Fi network 110 is extra cost associated with each extender device. Further, each extender device must be manually onboarded to the gateway, which complicates network setup.

Another way to compensate for Wi-Fi client device 106 leaving the Wi-Fi network 110 is to connect Wi-Fi client device to a hotspot device. This will be further described with reference to FIG. 4 below.

Figure 4:
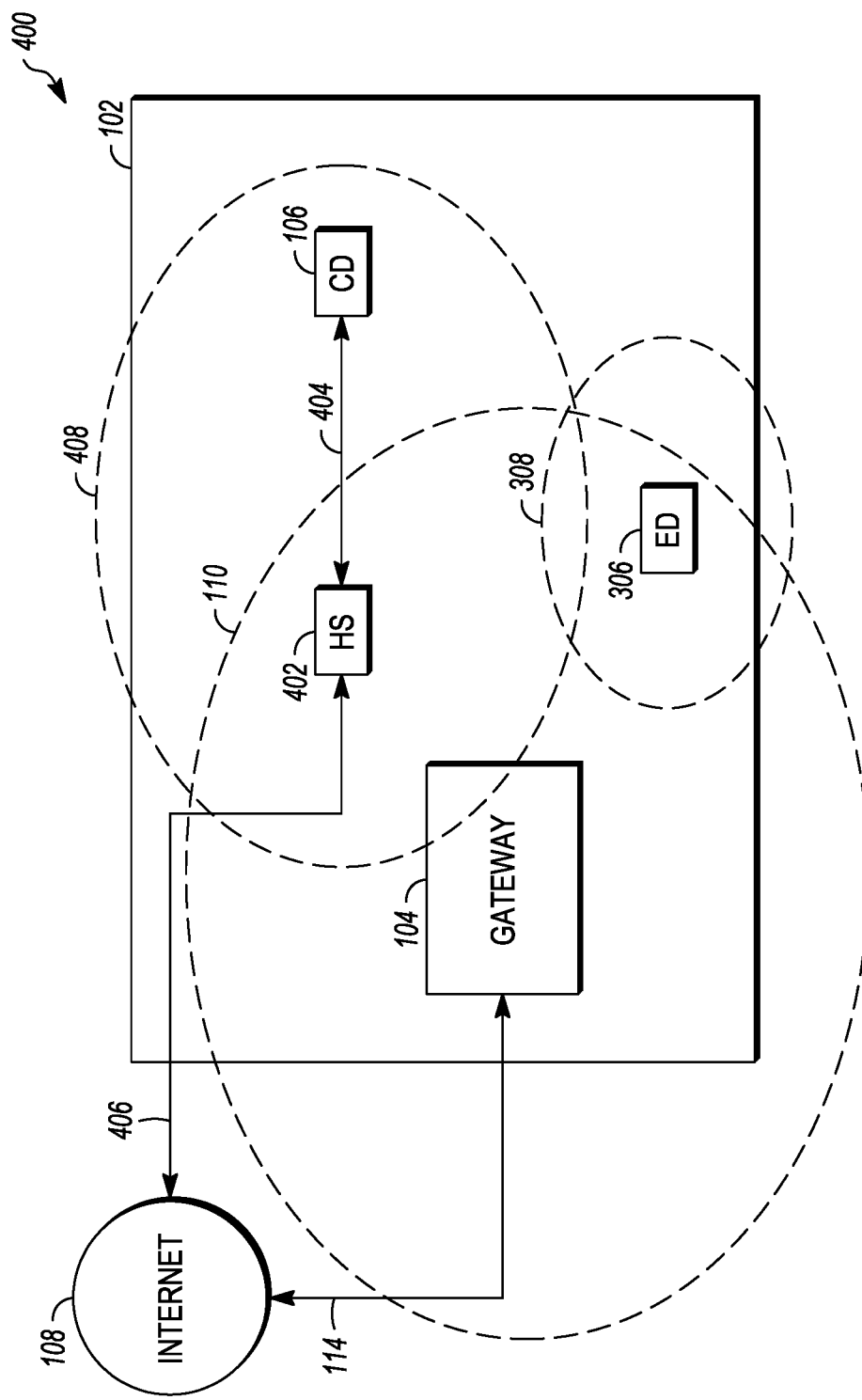
FIG. 4 illustrates a further example of a prior art wireless communication system.

FIG. 4 illustrates another prior art wireless communication system 400.

Wireless communication system 400 is similar to wireless communication system 300, but in wireless communication system 400, extender device 302 is replaced with a hotspot device 402.

Hotspot device 402 is in communication with the Internet 108 through a wireless communication channel 406, whereas Wi-Fi client device 106 is in communication with hotspot device 402 through a wireless communication channel 404.

Hotspot device 402 may be any device or system that has hotspot functionality so as able to enable Wi-Fi client device 106 to wirelessly communicate directly with Internet 108 by any known method.

A "hotspot" is a physical location where people may obtain Internet access, typically using Wi-Fi technology, via a wireless local area network (WLAN) using a router, are gateway, connected to an Internet service provider. A hotspot device as used herein, is a Wi-Fi enabled device that acts as a hotspot.

Hotspot device 402 enables a client device to communicate with Internet 104, even if the client device is outside of Wi-Fi network 110, so long as the client device is within the hotspot 408 created by hotspot device 402. In this example of a hotspot device 402 enables client device 106 to communicate with Internet 108, as client device is outside of Wi-Fi network 110, but is within hotspot 408.

A problem with using hotspot devices to supplement Internet access in a wireless network is that the user of the client device must manually find the hotspot device and then manually onboard onto the found hotspot device. This manual searching an onboarding is time consuming and sometimes too complicated for some client device users.

A system and method in accordance with aspects of the present disclosure provides alternative options for a client device to automatically access the Internet if the client device leaves a wireless network provided by a gateway and addresses the problems of the prior art systems discussed above with reference to FIGS. 3-4.

A system and method in accordance with aspects of the present disclosure seeks to utilize a nearby device that supports the Wi-Fi hotspot functionality (i.e. 802.11s) as an alternate path for Internet access when Wi-Fi router coverage is not adequate. Mobile devices and other devices such as cars now support Wi-Fi hotspot functionality (i.e. 802.11s). This coupled with the fact that many consumer's 4G data plans include unlimited data coverage provide feasibility for a system and method in accordance with aspects of the present disclosure.

A system and method in accordance with aspects of the present disclosure includes support to automatically redirect the Wi-Fi client device to use a hotspot of a near-by hotspot device for alternate Internet access instead of only using the Wi-Fi router without any interaction from the consumer using the Wi-Fi client device. By using these device hotspots as an alternative to accessing the Internet within the consumer's home, a system and method in accordance with aspects of the present disclosure can increase Wi-Fi coverage in strategic location(s) on the consumer premises where Wi-Fi signal coverage is not met by the existing Wi-Fi router. In a sense, a system and method in accordance with aspects of the present disclosure is automatically adding these device hotspots to a consumer's Wi-Fi network.

To ensure that Wi-Fi connectivity to the device hotspot stays in-tact, a hotspot functionality enabled Wi-Fi client device may be disposed in a strategic location. Also, a device such as a car which includes Wi-Fi hotspot functionality may additionally be used to increase coverage. This is especially useful for scenarios where a temporary extension of the wireless "cloud of connectivity" is needed.

In accordance with aspects of the present disclosure, a router, or gateway having a router capability, provides support to continuously sense Wi-Fi client device Internet bandwidth usage operating on the consumer premises. If the router, or gateway having a router capability, senses that a Wi-Fi client device is not getting enough bandwidth from the Wi-Fi Router, it will redirect the Wi-Fi client device to use a nearby device hotspot for Internet access if available. The router, or gateway having a router capability, may continuously obtain diagnostic information so it can track Internet bandwidth usage for each Wi-Fi client device that is operating on the consumer premises.

A router, or gateway having a router capability, may be configured to either select a specific hotspot device for Wi-Fi client redirection or to allow the router, or gateway having a router capability, to automatically determine which nearby device hotspot to use for redirection. In some embodiments, the consumer may know that a specific hotspot device is located nearby an area where the router, or gateway having a router capability, cannot provide adequate coverage. In this situation, the consumer may configure the Wi-Fi client device to just use that hotspot device. In other embodiments, the consumer may want the router, or gateway having a router capability, to make the decision where to redirect the Wi-Fi client to a nearby hotspot device.

In an example of an embodiment, if the router, or gateway having a router capability, has been configured to make the decision where to redirect the Wi-Fi client to a nearby hotspot device, the router, or gateway having a router capability, may provide support to track the location of each Wi-Fi client device and each hotspot device residing on the consumer premises. In one embodiment, the router, or gateway having a router capability, may be configured to automatically determine which hotspot device should be used for redirection. This support is used to determine which hotspot device should be used for a given Wi-Fi client device when redirection is needed. The combination of device location information and Internet access bandwidth usage may be two criteria used in deciding when and how to redirect Wi-Fi client devices.

The router, or gateway having a router capability, may continuously communicate to both the Wi-Fi client and the hotspot device to obtain the distance of each device to its Wi-Fi access point. The router, or gateway having a router capability, may use any known method or system to determine the distance between the device and its current Wi-Fi access point.

Although the specific location technology used herein is not central to the ideas presented in this disclosure, it should be noted that both Wi-Fi location and beacon based location technologies exist. Beacons are sensors that send out Bluetooth low energy (BLE) tracking tags. These sensors can be placed around a venue, such as a store, and a mobile device can pick up the BLE signal and determine that it is near. The intent is that a location technology exists on the consumer premises and will provide location details of the Wi-Fi client and hotspot devices within the consumer's home to the router, or gateway having router capabilities.

An accurate way to monitor a Wi-Fi client's bandwidth usage would be to get this information from the router itself, or the gateway having router capabilities. All the devices on the network connect to the Internet through the router, or the gateway having router capabilities, so this is the single point where bandwidth usage and data transfers can be monitored and logged. The router, or the gateway having router capabilities, may continuously monitor the bandwidth usage of these devices and use this information to help determine when redirection to a mobile device hotspot will be necessary.

The router, or gateway having router capabilities, may perform configuration tasks for the hotspot device. First, the router, or gateway having router capabilities, may communicate to the hotspot device and determine if the hotspot device has enabled its hotspot functionality. If the hotspot functionality of the hotspot device is not enabled, the router, or gateway having router capabilities, may communicate with the hotspot device to automatically enable the hotspot functionality. Also, the router, or gateway having router capabilities, may provide the SSID and password of the router, or the gateway having router capabilities, to the Wi-Fi client device so that the Wi-Fi client device may it use to login to the hotspot device. By using the same SSID and password as the router, or gateway having router capabilities, a system in accordance with aspects of the present disclosure essentially adds the hotspot device to the Wi-Fi router Wi-Fi network in the same manner as a Wi-Fi extender is added.

In an example of an embodiment, the gateway uses the Wi-Fi client bandwidth usage data, the location data of this device and the location data of near-by device hotspots to determine when to redirect a Wi-Fi client device if configured to find a nearby hotspot device. If the client is configured to use a specific hotspot device then the gateway will not need to make any decisions on which nearby hotspot device to use. The gateway may interact with both the client and hotspot devices to carry out the process of redirection.

In some embodiments, when the router, or gateway having router capabilities, senses that a minimum Wi-Fi device bandwidth has occurred, it passes the SSID and password of the Wi-Fi hotspot, to the Wi-Fi client device and makes sure the signal strength of the nearby hotspot is acceptable. The router, or gateway having router capabilities, then commands the client device to re-direct its Internet access path. The client device then disconnects from the router, or gateway having router capabilities, and then reconnects to the hotspot device using SSID and password of the router, or gateway having router capabilities.

Examples of a system and method for automatically redirecting a Wi-Fi client to a nearby Wi-Fi hotspot device for alternate Internet access will now be described with reference to FIGS. 5-14.

Figure 5:
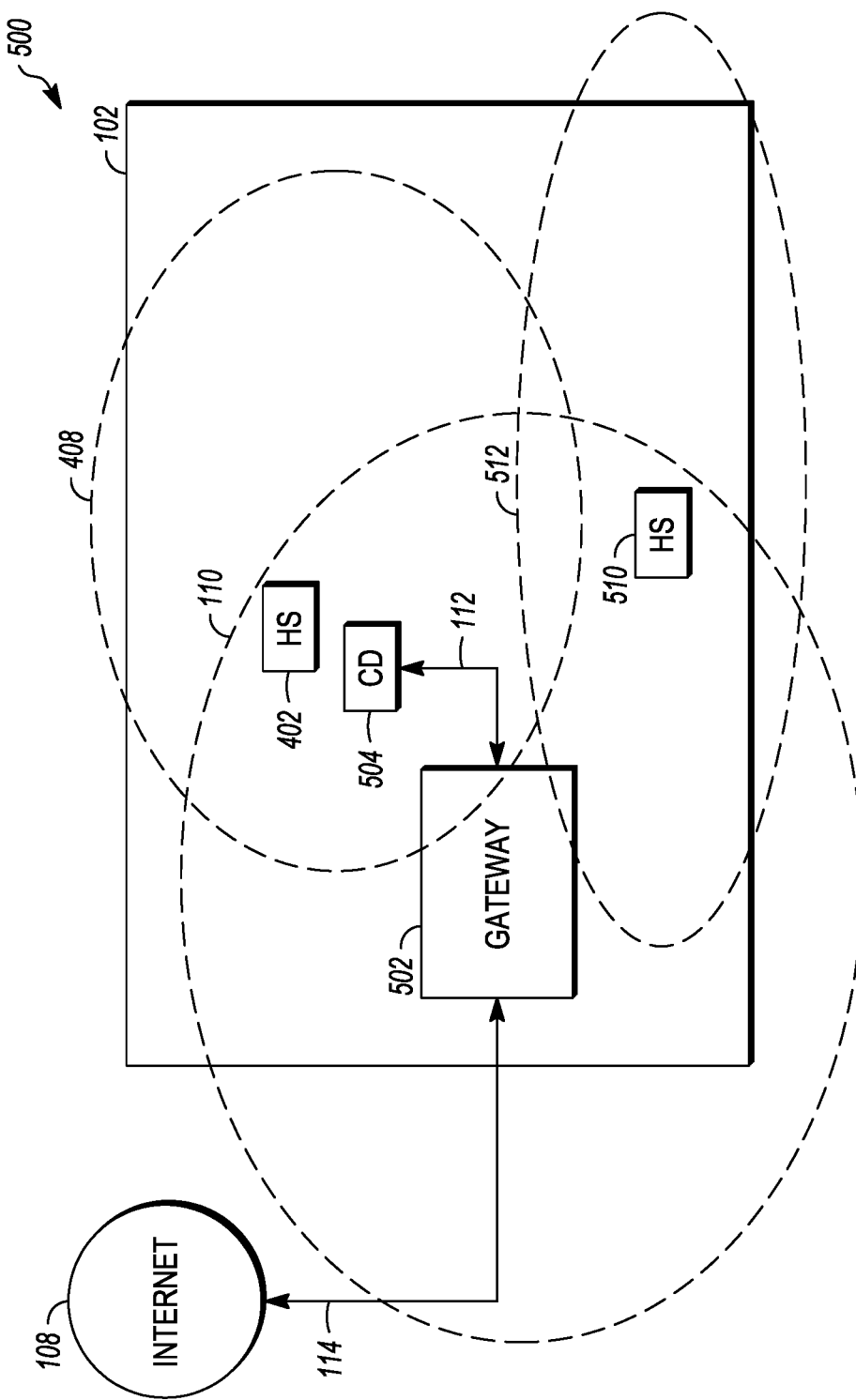
FIG. 5 illustrates an embodiment of a wireless communication system in accordance with aspects of the present disclosure at a time $t_3$.

FIG. 5 illustrates an embodiment of a wireless communication system 500, in accordance with aspects of the present disclosure at a time $t_3$.

As shown in the figure, wireless communication system 500 includes house 102, a gateway 502, a Wi-Fi client device 504, hotspot device 402, a hotspot device 510 and the Internet 108.

Gateway 502, Wi-Fi client device 504, hotspot device 402 and hotspot device 510 are disposed within house 102. Wi-Fi client device 106 is disposed within Wi-Fi network 110 of gateway 502. Gateway 502 is in communication with Wi-Fi client device 504 via communication channel 112 and is in communication with Internet 108 via communication channel 114.

Gateway 502 may be any gateway that is further operable to generate a Wi-Fi network, as will be described in greater detail below; register the Wi-Fi hotspot device by receiving Wi-Fi hotspot device login information from the Wi-Fi hotspot device that enables connection with the Wi-Fi hotspot device, as will be described in greater detail below; receive a login signal from the Wi-Fi client device to login to the Wi-Fi network, as will be described in greater detail below; register the Wi-Fi hotspot device, as will be described in greater detail below; connect the Wi-Fi client device to the Wi-Fi network based on the login signal, as will be described in greater detail below; determine the location of the Wi-Fi hotspot device, as will be described in greater detail below; determine the location of the Wi-Fi client device, as will be described in greater detail below; transmit a redirection instruction to a Wi-Fi client device to instruct the Wi-Fi client device to redirect to a Wi-Fi hotspot device, as will be described in greater detail below; update the location of the Wi-Fi hotspot device at predetermined first intervals, as will be described in greater detail below; update the location of the Wi-Fi client device at predetermined second intervals, as will be described in greater detail below; generate a redirection instruction based on the location of the Wi-Fi hotspot device and the location of the Wi-Fi client device, as will be described in greater detail below; generate the redirection instruction based on the location of the Wi-Fi client device and a most recent location of the Wi-Fi hotspot device as determined via the Wi-Fi hotspot location determining component, as will be described in greater detail below; and generate the redirection instruction based on a most recent location of the Wi-Fi client device as determined via the client location determining component and the most recent location of the Wi-Fi hotspot device as determined via the Wi-Fi hotspot location determining component, as will be described in greater detail below; generate the redirection instruction so as to include the Wi-Fi hotspot device login information to enable the Wi-Fi client device to automatically connect with the Wi-Fi hotspot device, as will be described in greater detail below.

Wi-Fi client device 504 differs from Wi-Fi client device 106 in that Wi-Fi client device 504 can receive a redirection instruction from gateway 502 and to redirect communication to hotspot device 510 based on the redirection instruction, as will be described in more detail below.

Hotspot device 510 may be any device or system that has hotspot functionality so as able to enable Wi-Fi client device 504 to wirelessly communicate with Internet 108 by any known method.

In operation, gateway 502 enables Wi-Fi client device 504 to communicate with Internet 108 so long as Wi-Fi client device 504 is within Wi-Fi network 110. Further, gateway 110 monitors the location of each of Wi-Fi client device 504, hotspot device 402 and hotspot device 510 to generate a redirection instruction.

The redirection instruction includes login credentials, including for example an SSID and password, to login to a predetermined hotspot device and instructs Wi-Fi client device 504 to on-board onto the predetermined hotspot device if Wi-Fi client device 504 leaves Wi-Fi network 110 or if the signal loss on channel 112 between Wi-Fi client device 504 and gateway 502 drops below a predetermined threshold.

Gateway 502 transmits the redirection instruction to Wi-Fi client device 504. In the event that Wi-Fi client device 504 leaves Wi-Fi network 110 or the signal loss on channel 112 between Wi-Fi client device 504 and gateway 502 drops below a predetermined threshold, Wi-Fi client device 504 automatically on-boards onto the predetermined hotspot device indicated in the redirection instruction using the login credentials that are additionally provided in the redirection instruction.

Figure 10:
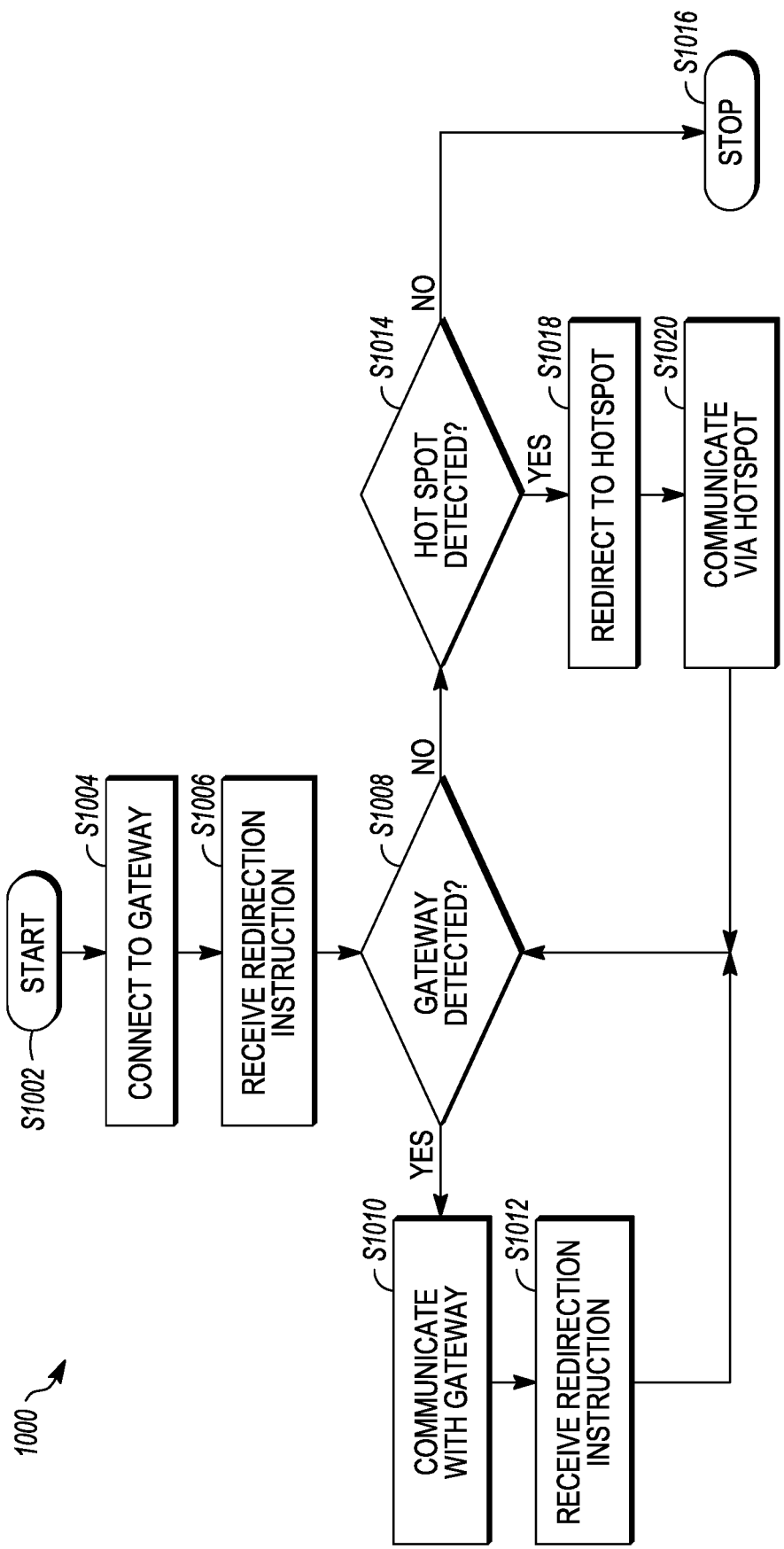
FIG. 10 illustrates a method of operating a Wi-Fi client device, in accordance with aspects of the present disclosure.
Figure 11:
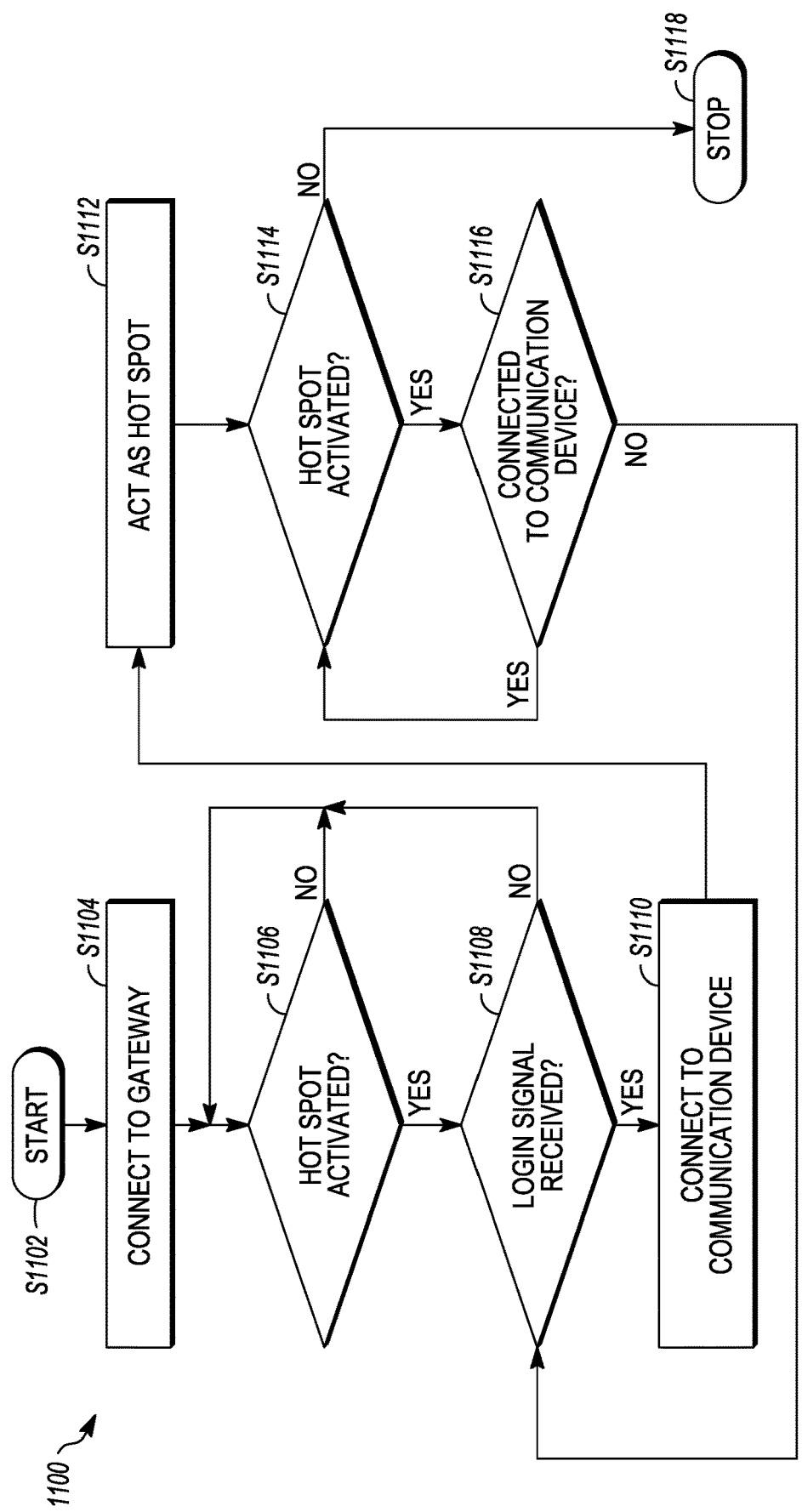
FIG. 11 illustrates a method 1100 for operating a hotspot device, in accordance with aspects of the present disclosure.

This method of automatically redirecting a Wi-Fi client to a nearby hotspot device for alternate Internet access in accordance with aspects of the present disclosure will be described in greater detail with reference to FIGS. 6A-14. For purposes of discussion, there are three "players" involved with the method of the present disclosure—gateway 502, Wi-Fi client device 504 and the group of available hotspot devices, which in this example includes hotspot device 402 and hotspot device 504. As discussed below a method 600 of FIGS. 6A-6B is drawn to a method of operation (from the perspective of) gateway 502, a method 1000 of FIG. 10 is drawn to a method of operation (from the perspective of) Wi-Fi client device 504 and a method 1100 of FIG. 11 is drawn to a method of operation (from the perspective of) a hotspot device.

Figure 6A:
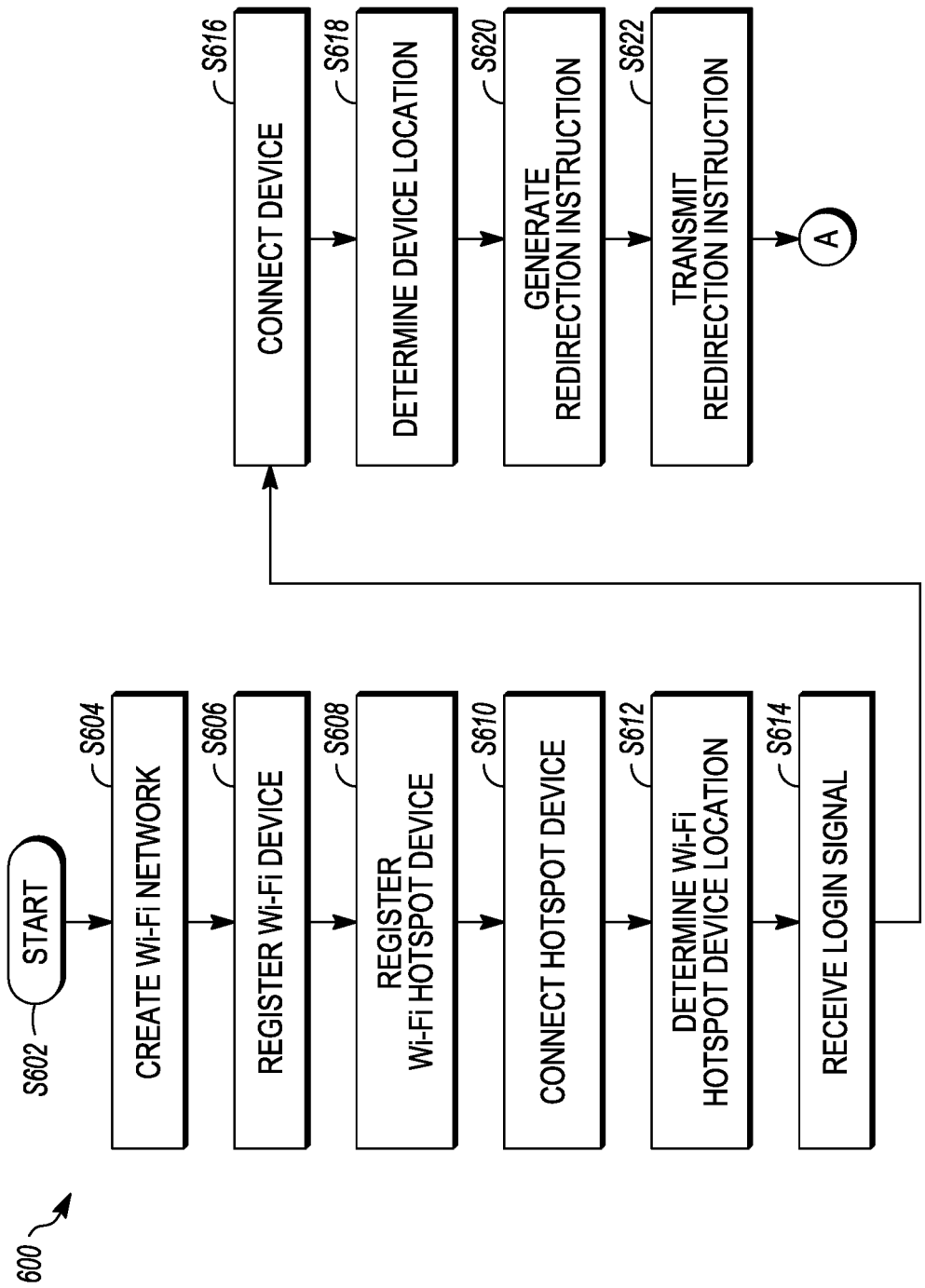
FIGS. 6A-B illustrate a method 600 for automatically redirecting a Wi-Fi client to a nearby hotspot device for alternate Internet access, in accordance with aspects of the present disclosure.
Figure 6B:
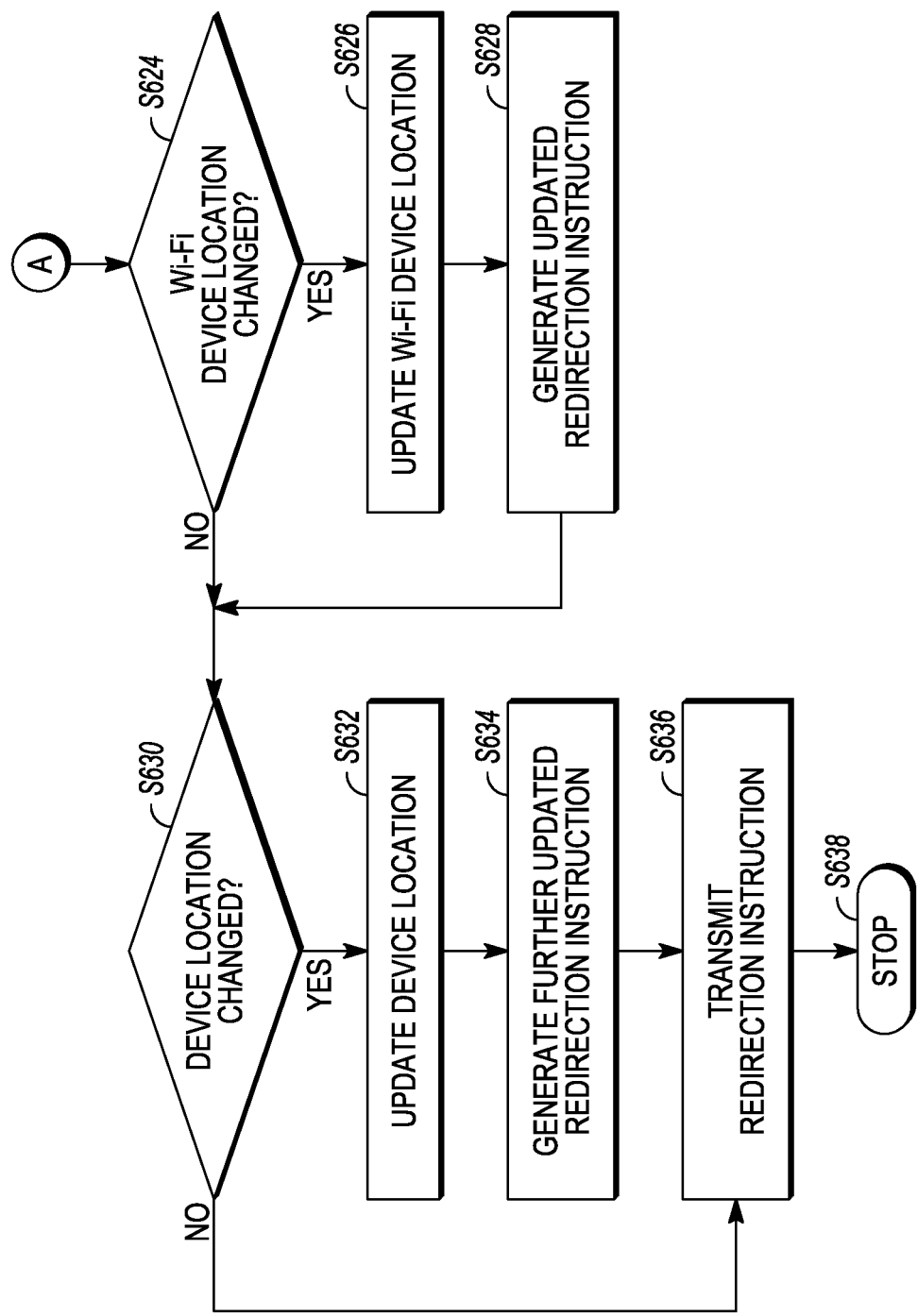

FIGS. 6A-B illustrate method 600 for automatically redirecting a Wi-Fi client to a nearby hotspot device for alternate Internet access, in accordance with aspects of the present disclosure.

As shown in FIG. 6A, method 600 starts (S602), and a Wi-Fi network is created (S604). In an example of an embodiment, for example as shown in FIG. 5, gateway 502 creates Wi-Fi network 110.

Figure 7:
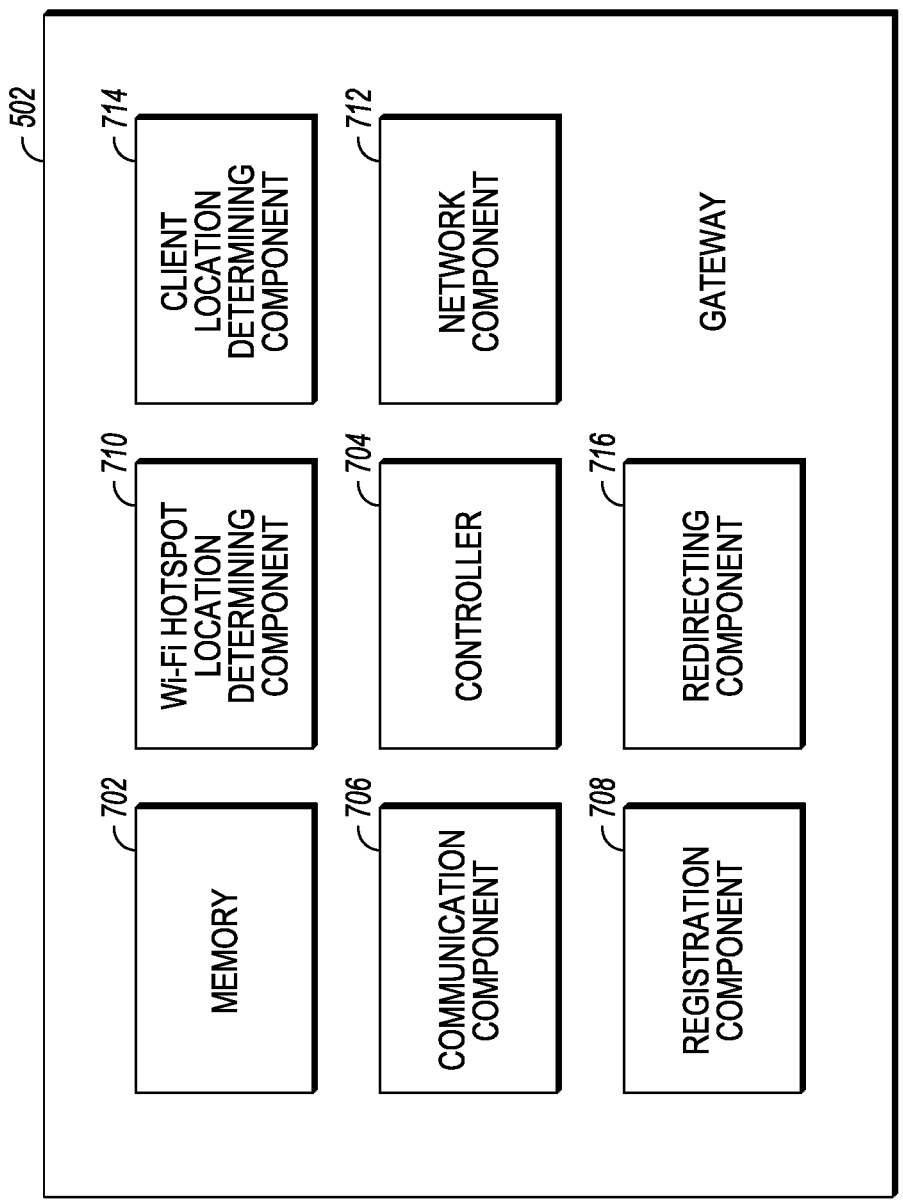
FIG. 7 illustrates the example of a gateway device of FIG. 5, in accordance with aspects of the present disclosure.

FIG. 7 illustrates an example of a gateway device 502, in accordance with aspects of the present disclosure.

As shown in the figure, gateway device 502 includes a memory 702, a controller 704, a communication component 706, a registration component 708, a Wi-Fi hotspot location determining component 710, a network connection component 712, a client location determining component 714 and a redirecting component 716.

In this example, memory 702, controller 704, communication component 706, registration component 708, Wi-Fi hotspot location determining component 710, network component 712, client location determining component 714 and redirecting component 716 are illustrated as individual devices. However, in some embodiments, at least two of memory 702, controller 704, communication component 706, registration component 708, Wi-Fi hotspot location determining component 710, network component 712, client location determining component 714 and redirecting component 716 may be combined as a unitary device. Further, in some embodiments, at least one of memory 702, controller 704, communication component 706, registration component 708, Wi-Fi hotspot location determining component 710, network component 712, client location determining component 714 and redirecting component 716 may be implemented as a computer having tangible computer-readable medium for carrying or having computer-executable instructions or data structures stored thereon. Such tangible computer-readable medium can be any available medium that can be accessed by a general purpose or special purpose computer. Non-limiting examples of tangible computer-readable medium include physical storage and/or memory medium such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable medium.

Examples of tangible computer-readable media may be coupled to a processor such that the processor may read information from, and write information to the tangible computer-readable medium. In the alternative, the tangible computer-readable medium may be integral to the processor. The processor and the tangible computer-readable medium may reside in an application specific integrated circuit ("ASIC"). In the alternative, the processor and the tangible computer-readable medium may reside as discrete components.

Examples of tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Memory 702 may be any known memory, non-limiting examples of which include physical storage and/or memory medium such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Controller 704 may be any device that is operable to control memory 702, communication component 706, registration component 708, Wi-Fi hotspot location determining component 710, Wi-Fi network component 712, client location determining component 714 and redirecting component 716.

Communication component 706 may be any device or system that is operable to: transmit the redirection instruction to the Wi-Fi client device to instruct the Wi-Fi client device to redirect to the Wi-Fi hotspot device, as will be described in greater detail below; and receive a login signal from the Wi-Fi client device to login to the Wi-Fi network, as will be described in greater detail below.

Registration component 708 may be any device that is operable to: register the Wi-Fi hotspot device, as will be described in greater detail below; and register the Wi-Fi hotspot device by receiving Wi-Fi hotspot device login information from the Wi-Fi hotspot device that enables connection with the Wi-Fi hotspot device, as will be described in greater detail below.

Wi-Fi network component 712 may be any device or system that is operable to: generate a Wi-Fi network, as will be described in greater detail below; and connect the Wi-Fi client device to the Wi-Fi network based on the login signal, as will be described in greater detail below.

In an example of an embodiment, controller 704 instructs Wi-Fi network component 712 to generate Wi-Fi network 110.

Returning to FIG. 6A, after the Wi-Fi network is created (S604), a Wi-Fi client device is registered (S606). In an example of an embodiment, gateway 502 registers client device 504. This will be described in greater detail with reference to FIGS. 7 and 8.

Figure 8:
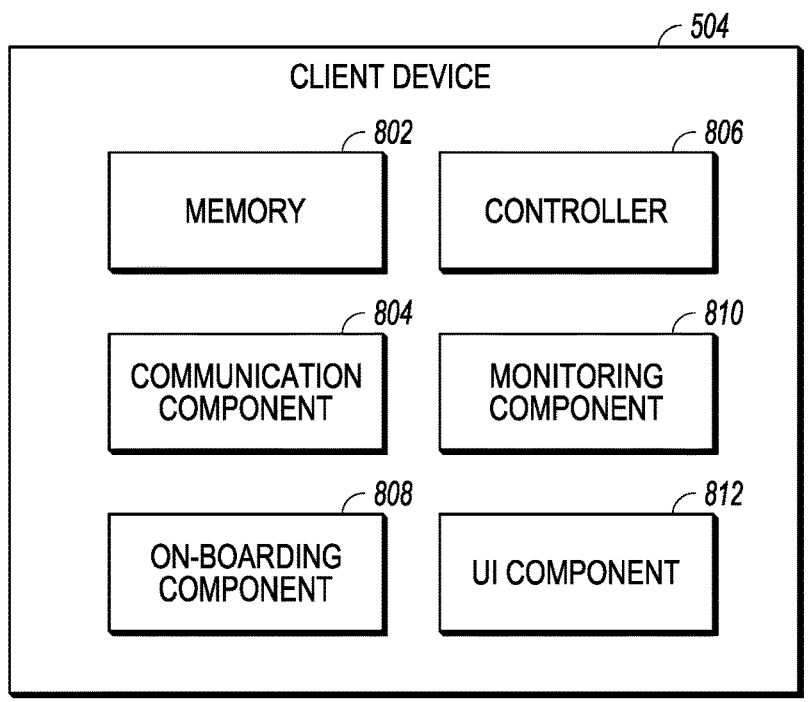
FIG. 8 illustrates the example of a Wi-Fi client device of FIG. 5, in accordance with aspects of the present disclosure.

FIG. 8 illustrates an example of a Wi-Fi client device 504, in accordance with aspects of the present disclosure.

As shown in the figure, Wi-Fi client device 504 includes a memory 802, a communication component 804, a controller 806, an on-boarding component 808, a monitoring component 810 and a user interface ("UI") component 812.

In this example, memory 802, communication component 804, controller 806, on-boarding component 808, monitoring component 810 and UI component 812 are illustrated as individual devices. However, in some embodiments, at least two of memory 802, communication component 804, controller 806, on-boarding component 808, monitoring component 810 and UI component 812 may be combined as a unitary device. Further, in some embodiments, at least one of memory 802, communication component 804, controller 806, on-boarding component 808, monitoring component 810 and UI component 812 may be implemented as a computer having tangible computer-readable medium for carrying or having computer-executable instructions or data structures stored thereon.

Memory 802 may be any known memory, non-limiting examples of which include physical storage and/or memory medium such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Communication component 804 may be any device that is able to transmit and receive data within the Wi-Fi standard.

Controller 806 may be any device that is operable to control and operate memory 802, communication component 804, on-boarding component 808, monitoring component 810, and UI component 812.

On-boarding component 808 may be any device that is able to on-board onto gateway 502 or a hotspot enable device.

UI component 812 may be any device or system that is operable to enable a user to access and control controller 806. UI component 812 may include one or more layers including a human-machine interface (HMI) machines with physical input hardware such as keyboards, mice, game pads and output hardware such as computer monitors, speakers, and printers. Additional UI layers in UI component 812 may interact with one or more human senses, including: tactile UI (touch), visual UI (sight), and auditory UI (sound).

In operation, for Wi-Fi client device 504 to join Wi-Fi network 110, client device 504 must first onboard, or register, with gateway 502. This may be performed by any known method. As a non-limiting example, a user of Wi-Fi client device 504 may interact with UI component 812 to search for available Wi-Fi networks. In this example, for the purpose of discussion, as Wi-Fi client device 504 is disposed within Wi-Fi network 110, upon searching for available Wi-Fi networks, UI component 812 would list Wi-Fi network 110 for the user to join. By selecting Wi-Fi network 110 by way of UI component 812, controller 806 instructs onboarding component 808 to perform the necessary handshake protocol with gateway 502 by way of a wireless communication through communication component 804.

Returning to FIG. 7, communication component 706 of gateway communicates with Wi-Fi client device 504 during registration. Controller 704 instructs registration component 708 to register Wi-Fi client device 504, so long as client device 504 provides the required credentials, such as the SSID and password for gateway 502. Typically, the user of Wi-Fi client device 504 may find the SSID and password for gateway 502 on gateway 502.

Returning to FIG. 8, after Wi-Fi client device 504 is registered with gateway 502, the SSID and password for gateway 502 is stored in memory 802. In the future, when Wi-Fi client device 504 detects Wi-Fi network 110, onboarding component 808 may retrieve the SSID and password for gateway 502 from memory 802 in order to automatically login to Wi-Fi network 110 without any action by the user.

Returning to FIG. 6A, after the Wi-Fi client device is registered (S606), a Wi-Fi hotspot device is registered (S608). In an example of an embodiment, gateway 502 registers hotspot device 402 and hotspot device 510. This will be described in greater detail with reference to FIGS. 7 and 9.

Figure 9:
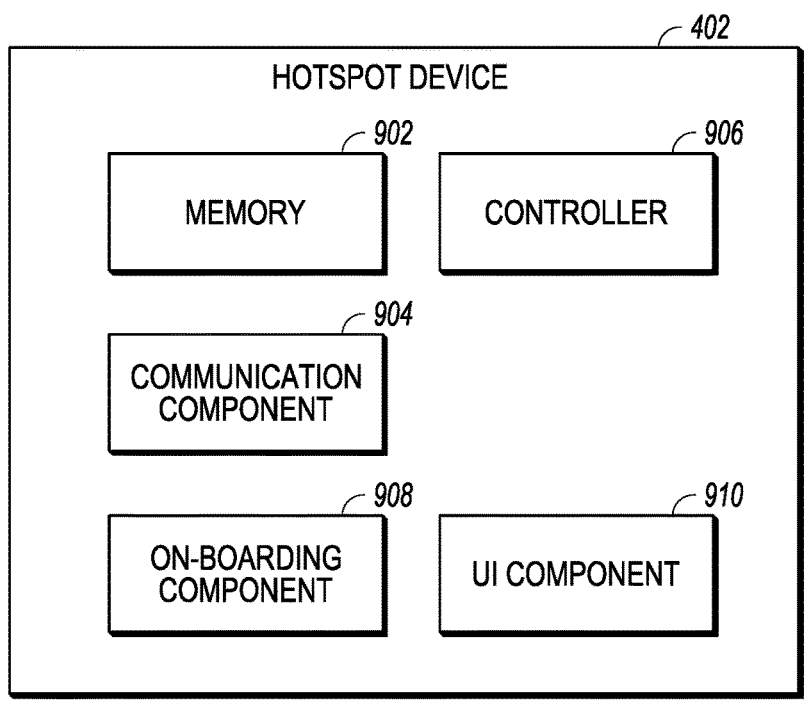
FIG. 9 illustrates the example of a hotspot device of FIG. 5, in accordance with aspects of the present disclosure.

FIG. 9 illustrates an example of a hotspot device 402, in accordance with aspects of the present disclosure.

As shown in the figure, hotspot device 402, a memory 902, a communication component 904, a controller 906, an on-boarding component 908 and a user interface (UI) component 910. It should be noted that hotspot device 510 would have the same elements as hotspot device 402, and will be registered in the same manner. For purposes of brevity, only the registration of hotspot device 402 will now be described.

In this example, memory 902, communication component 904, controller 906, on-boarding component 908 and UI component 910 are illustrated as individual devices. However, in some embodiments, at least two of memory 902, communication component 904, controller 906, on-boarding component 908 and UI component 910 may be combined as a unitary device. Further, in some embodiments, at least one of memory 902, communication component 904, controller 906, on-boarding component 908 and UI component 910 may be implemented as a computer having tangible computer-readable medium for carrying or having computer-executable instructions or data structures stored thereon.

Memory 902 may be any known memory, non-limiting examples of which include physical storage and/or memory medium such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Communication component 904 may be any device that is able to communicate within the Wi-Fi standard and to communicate with hotspot functionality.

Controller 906 may be any device that is operable to control and operate memory 902, communication component 904, and on-boarding component 908.

On-boarding component 908 may be any device that is able to on-board gateway 504.

UI component 910 may be any device or system that is operable to enable a user to access and control controller 906. UI component 910 may include one or more layers including a human-machine interface (HMI) machines with physical input hardware such as keyboards, mice, game pads and output hardware such as computer monitors, speakers, and printers. Additional UI layers in UI component 910 may interact with one or more human senses, including: tactile UI (touch), visual UI (sight), and auditory UI (sound).

In operation, for hotspot device 402 to join Wi-Fi network 110, hotspot device 402 must first onboard, or register, with gateway 502. This may be performed by any known method. As a non-limiting example, a user of hotspot device 402 may interact with UI component 908 to search for available Wi-Fi networks. In this example, for the purpose of discussion, as hotspot device 402 is disposed within Wi-Fi network 110, upon searching for available Wi-Fi networks, UI component 908 would list Wi-Fi network 110 for the user of hotspot device 402 to join. By selecting Wi-Fi networks 110 by way of UI component 908, controller 906 instructs onboarding component 908 to perform the necessary handshake protocol with gateway 502 by way of a wireless communication through communication component 904.

Returning to FIG. 7, communication component 706 of gateway communicates with hotspot device 402 during registration. Controller 704 instructs registration component 708 to register hotspot device 402, so long as hotspot device 402 provides the required credentials, such as the SSID and password for gateway 502. Typically, the user of hotspot device 402 may find the SSID and password for gateway 502 on gateway 502.

Returning to FIG. 9, after hotspot device 402 is registered with gateway 502, the SSID and password for gateway 502 is stored in memory 902. In the future, when hotspot device 402 detects Wi-Fi network 110, on-boarding component 908 may retrieve the SSID and password for gateway 502 from memory 802 in order to automatically login to Wi-Fi network 110 without any action by the user.

Further, in accordance with aspects of the present disclosure, gateway 502 obtains the required credentials from hotspot device 402, such as the SSID and password, to access hotspot device 402 when hotspot device 402 has hotspot functionality activated. In other words, when hotspot device 402 is willing and able to support other Wi-Fi devices as a hotspot. In particular, in some embodiments, gateway 502 pulls the credentials from hotspot device 402. In other embodiments, hotspot device 402 pushes the credentials to gateway 502.

Returning to FIG. 9, memory 902 of hotspot device 402 includes the credentials required to access a hotspot created by hotspot device 402 when the hotspot functionality is activated. Controller 906 retrieves these credentials from memory 902 and instructs communication component 904 to provide the credentials to gateway 502, either by a request from gateway 502 in a pull or by a direct push.

Returning to FIG. 7, communication component 706 receives the credentials from hotspot device 402. Controller 704 then instructs communication component 706 to store the credentials for hotspot device 402 in memory 702. As noted above, with respect to hotspot device 510, the credentials for hotspot device 510 will additionally be stored in memory 702.

Returning to FIG. 6A, after a Wi-Fi hotspot device is registered (S608), the Wi-Fi hotspot device is connected (S610). This will be described in greater detail with reference to FIG. 11.

FIG. 11 illustrates a method 1100 for operating a hotspot device, in accordance with aspects of the present disclosure.

As shown in the figure, method 1100 starts (S1102) and connects to gateway (S1104). For example, as shown in FIG. 5, once registered, either one of hotspot device 402 or hotspot device 510 may leave Wi-Fi network 110, and thus disconnect with gateway 502. However, when they return to Wi-Fi network 110, they may automatically reconnect with Wi-Fi network 110 using the stored credentials for gateway 502. In particular, as shown in FIG. 9, controller 906 instructs on-boarding component 908 to pull the credentials for gateway 502 from memory 902. These credentials a passed to gateway 502 by way of communication component 904 during the automatic login process.

Returning to FIG. 6A, after the hotspot device is connected (S610), the location of the Wi-Fi hotspot location is found (S612). An example of an embodiment of gateway 502 determines the location of hotspot devices within Wi-Fi network 110.

For example, returning to FIG. 7, Wi-Fi hotspot location determining component 710 may be any device or system that is operable to: determine the location of the Wi-Fi hotspot device, as will be described in greater detail below; and update the location of the Wi-Fi hotspot device at predetermined first intervals, as will be described in greater detail below.

Wi-Fi hotspot location determining component 710 may determine the location of hotspot device 402 and hotspot device 510 by any known Wi-Fi location and beacon based location technology.

Once determined, the location of each hotspot device is stored in memory 702 and is associated with the respective hotspot device. In this manner, Wi-Fi hotspot location determining component 710 may retrieve the location of each hotspot device as needed.

Returning to FIG. 6A, after the location of the hotspot device has been determined (S612), a login signal is received (S614). For example, returning to FIG. 5, gateway 502 may receive a login signal from Wi-Fi client device 504. In particular, for purposes of discussion, let the user of Wi-Fi client device 504 be returning from being away for Wi-Fi network 110. As mentioned previously, as Wi-Fi client device 504 has previously registered with gateway, when Wi-Fi client device 504 returns to Wi-Fi network 110, Wi-Fi client device 504 automatically logs into Wi-Fi network 110. Operation from the perspective of Wi-Fi client device 504 will now be described with additional reference to FIG. 10.

FIG. 10 illustrates a method 1000 of operating a Wi-Fi client device, in accordance with aspects of the present disclosure.

As shown in the figure, method 1000 starts (S1002) and the Wi-Fi client device connects to the gateway (S1004). For example, returning to FIG. 8, controller 806 instructs on-boarding component 808 to retrieve the credentials of gateway 502 from memory 802. These credentials are sent with the login signal by way of communication component so that Wi-Fi client device 504 may automatically, without input form the user, log onto Wi-Fi network 110.

Returning to FIG. 6A and the operation of gateway 502, after the login signal is received (S614), the Wi-Fi device is connected (S616). While connected, as shown in FIG. 5, Wi-Fi client device 504 is able to communicate with Internet 108 via communication channel 112, provided by Wi-Fi network 110, through gateway 502 and through channel 114.

Returning to FIG. 6A, after the Wi-Fi device is connected (S616), the location of the Wi-Fi device is determined (S618). An example of an embodiment of gateway 502 determines the location of Wi-Fi client device 504.

For example, returning to FIG. 7, client location determining component 714 may be any device or system that is operable to: determine the location of the Wi-Fi client device, as will be described in greater detail below; and update the location of the Wi-Fi client device at predetermined second intervals, as will be described in greater detail below.

Client location determining component 714 may determine the location of Wi-Fi client device 504 by any known Wi-Fi location and beacon based location technology.

Once determined, the location of Wi-Fi client device 504 is stored in memory 702 and is associated with Wi-Fi client device 504. In this manner, client location determining component 714 may retrieve the location of Wi-Fi client device 504 as needed.

Returning to FIG. 6A, after determining the device's location (S618), a redirection instruction is generated (S620). An example of an embodiment, redirecting component 716 generates the redirection instruction.

For example, returning to FIG. 7, redirecting component 716 may be any device or system that is operable to: generate a redirection instruction based on the location of the Wi-Fi hotspot device and the location of the Wi-Fi client device, as will be described in greater detail below; generate the redirection instruction based on the location of the Wi-Fi client device and a most recent location of the Wi-Fi hotspot device as determined via the Wi-Fi hotspot location determining component, as will be described in greater detail below; generate the redirection instruction based on a most recent location of the Wi-Fi client device as determined via the client location determining component and the most recent location of the Wi-Fi hotspot device as determined via the Wi-Fi hotspot location determining component, as will be described in greater detail below; and generate the redirection instruction so as to include the Wi-Fi hotspot device login information to enable the Wi-Fi client device to automatically connect with the Wi-Fi hotspot device, as will be described in greater detail below.

In operation, controller 704 instructs redirecting component 716 to generate a redirection instruction. The redirection instruction is based on the most recent location of Wi-Fi client device as determined by client location determining component 714 and stored in memory 702, and based on the most recent location of connected Wi-Fi hotspot devices as determined by Wi-Fi hotspot location determining component and stored in memory 702.

In an example of an embodiment, the redirection instruction is generated so as to redirect Wi-Fi client device 504 to the hotspot device, of all the connected Wi-Fi hotspot devices, that is located nearest to Wi-Fi client device 504. For example, returning to FIG. 5, Wi-Fi hotspot device 402 is closer to Wi-Fi client device 504 than Wi-Fi hotspot device 510. Accordingly, in an example of an embodiment, the redirection instruction would instruct Wi-Fi client device 504 to automatically redirect to Wi-Fi hotspot device 510.

Returning to FIG. 7, in operation, redirecting component 716 may retrieve, from memory 702, the location of Wi-Fi client device 504, the location of Wi-Fi hotspot device 510 and the location of Wi-Fi hotspot device 402. From these locations, redirecting component 716 may determine a distance $d_1$, between the location of Wi-Fi client device 504 and the location of Wi-Fi hotspot device 510. Further redirecting component 716 may determine a distance $d_2$, between the location of Wi-Fi client device 504 and the location of Wi-Fi hotspot device 402. Redirecting component 716 may then generate the redirection instruction so as to instruct Wi-Fi client device 504 to redirect to Wi-Fi hotspot device 510 when $d_1 < d_2$ and may generate the redirection instruction so as to instruct Wi-Fi client device 504 to redirect to Wi-Fi hotspot device 402 when $d_1 \geq d_2$. In this example, as shown in FIG. 5, $d_1 \geq d_2$, so redirecting component 716 would generate the redirection instruction so as to instruct Wi-Fi client device 504 to redirect to Wi-Fi hotspot device 402.

It should be noted that redirecting component 706 may use other parameters establish the most favorable Wi-Fi hotspot device for which to redirect a client device. Non-limiting parameters include a communication signal strength between a Wi-Fi hotspot device and gateway 502, a communication signal strength between a client device and gateway 502, an available data rate between a Wi-Fi hotspot device and gateway 502, an available data rate between a client device and gateway 502 and combinations thereof. Further, in some embodiments, redirecting component 706 may apply weighting factors to a plurality of parameters to establish a redirection factor to describe the most favorable Wi-Fi hotspot device for which to redirect a client device. This will be described in greater detail with reference to FIGS. 12A-B.

An example of a data structure that redirecting component 706 uses will now be described with reference to FIGS. 12A-B.

Figure 12A:
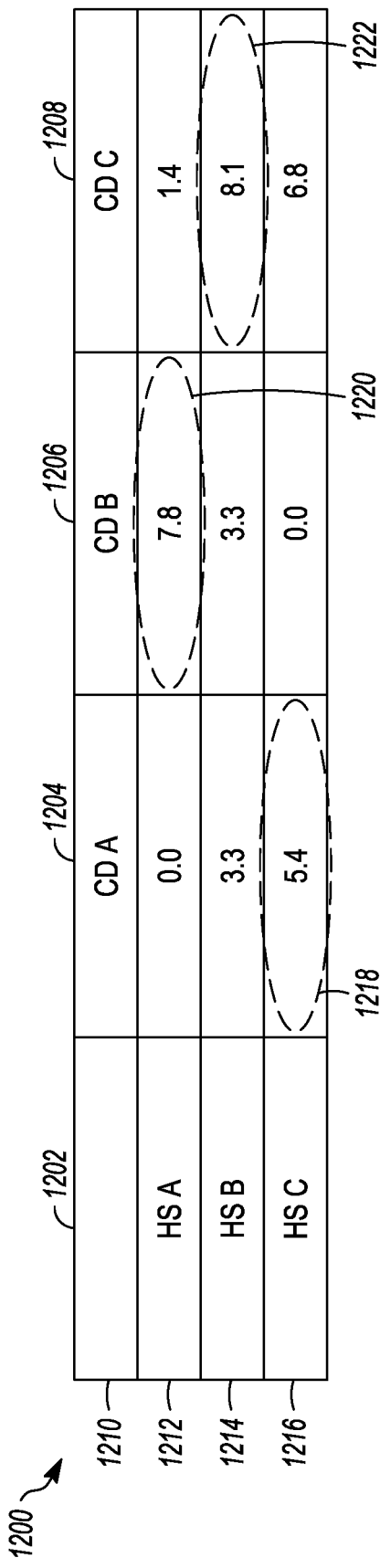
FIG. 12A illustrates a redirection lookup table, in accordance with aspects of the present disclosure at a time $t_4$.
Figure 12B:
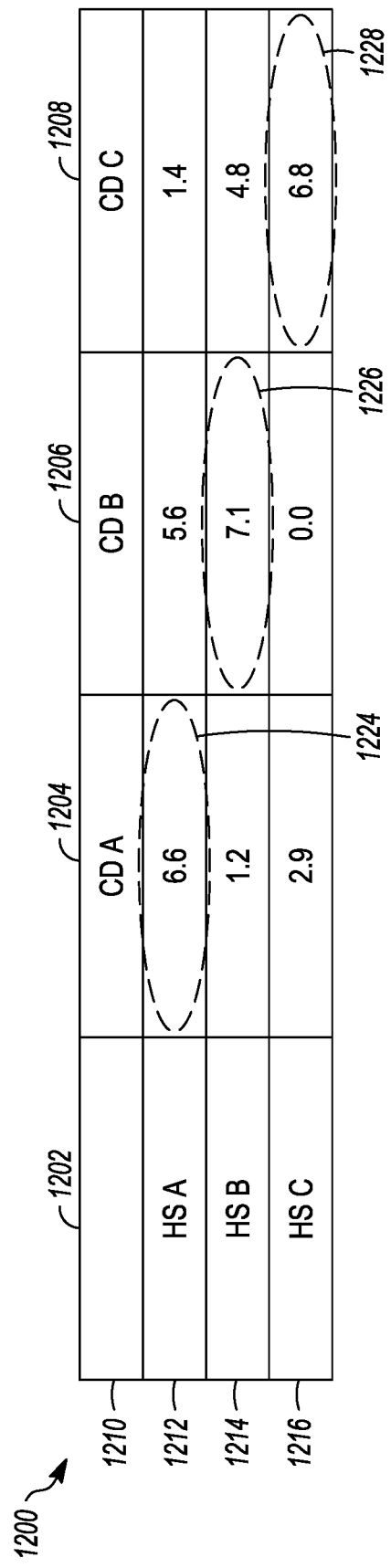
FIG. 12B illustrates the redirection lookup table at a time $t_5$.

FIG. 12A illustrates a redirection lookup table 1200 at a time $t_4$, whereas FIG. 12B illustrates redirection lookup table 1200 at a time $t_5$.

As shown in FIG. 12A, redirection lookup table 1200 includes a column 1202, a column 1204, a column 1206, a column 1208, a row 1210, a row 1212, a row 1214 and a row 1216.

Column 1202 lists a plurality of hotspot devices, wherein in this example, row 1212 of column 1202 corresponds to a hotspot device A (HS A) that is connected to the gateway, row 1214 of column 1202 corresponds to a hotspot device B (HS B) that is connected to the gateway and row 1216 of column 1202 corresponds to a hotspot device C (HS C) that is connected to the gateway.

Row 1210 lists a plurality of Wi-Fi client devices, wherein in this example, column 1204 of row 1210 corresponds to a Wi-Fi client device A (CD A) that is connected to the gateway, column 1206 of row 1210 corresponds to a Wi-Fi client device B (CD B) that is connected to the gateway and column 1208 of row 1210 corresponds to a Wi-Fi client device C (CD C) that is connected to the gateway.

Redirection lookup table 1200 includes a plurality of redirection factors that are used to determine redirection instructions for each Wi-Fi client device. The redirection factor may be determined based on apply weighting factors to a plurality of parameters to describe the most favorable Wi-Fi hotspot device for which to redirect a client device. The redirection factor may be of any scaled value, wherein in this non-limiting example, the scale of the redirection factor is from zero to ten, with ten being the highest factor. In this example of an embodiment, a gateway generate a redirection instruction so as to instruct a Wi-Fi client device to redirect to the hotspot device having the largest redirection factor associated with the Wi-Fi client device.

In this example, at time $t_4$, as shown in column 1204, CD A has: a 0.0 redirection factor with reference to HS A in row 1212; a 3.3 redirection factor with reference to HS B in row 1214; and a 5.4 redirection factor with reference to HS C in row 1216. In this case, the 5.4 redirection factor, as indicated by dotted ellipse 1218, is the largest redirection factor for CD A in lookup table 1200 at time $t_4$. Therefore the gateway would generate a redirection instruction so as to instruct a CD A to redirect to HS C.

As shown in column 1206, CD B has: a 7.8 redirection factor with reference to HS A in row 1212; a 3.3 redirection factor with reference to HS B in row 1214; and a 0.0 redirection factor with reference to HS C in row 1216. In this case, the 7.8 redirection factor, as indicated by dotted ellipse 1220, is the largest redirection factor for CD B in lookup table 1200 at time $t_4$. Therefore, the gateway would generate a redirection instruction so as to instruct a CD B to redirect to HS A.

As shown in column 1208, CD C has: a 1.4 redirection factor with reference to HS A in row 1212; a 8.1 redirection factor with reference to HS B in row 1214; and a 6.8 redirection factor with reference to HS C in row 1216. In this case, the 8.1 redirection factor, as indicated by dotted ellipse 1222, is the largest redirection factor for CD C in lookup table 1200 at time $t_4$. Therefore, the gateway would generate a redirection instruction so as to instruct a CD C to redirect to HS B.

Returning to FIG. 6A, after the redirection instruction is generated (S620), the redirection instruction is then transmitted (S622). For example, as shown in FIG. 7, controller 704 instructs redirecting component 716 to transmit the redirection instruction to Wi-Fi client device 504 by way of communication component 706.

Returning to the perspective from Wi-Fi client device 504 illustrated by method 1000 of FIG. 10, now that the Wi-Fi client device is connected to the gateway (S1004), a redirection instruction is received (S1006). For example, as shown in FIG. 8, communication component 804 receives the redirection instruction from gateway 502 and provides the redirection instruction to on-barding component 808.

Returning to FIG. 10, after the redirection instruction is received (S1006), it is determined whether the gateway is detected (S1008). In an example of an embodiment, for example as shown in FIG. 8, monitoring component 810 determines whether gateway 502 is detected.

Monitoring component 810 may be any device that is able to monitor for a Wi-Fi network created by a gateway or a Wi-Fi hotspot created by a hotspot enabled device, by any known method.

Returning to FIG. 5, if monitoring component 810 (not shown) in Wi-Fi client device 504 detects Wi-Fi network 110, and therefore detects gateway 502, then Wi-Fi client device 504 remains connected to Wi-Fi network. It should be noted that the phrase "detects Wi-Fi network 110" in some embodiments may mean detects a signal strength or data rate of Wi-Fi network 110 that is above a predetermined threshold such that remaining connected to Wi-Fi network 110 remains viable.

Returning to FIG. 10, if it is determined that the gateway is detected (Yes at S1008), then the Wi-Fi client device communicates with the gateway (S1010). For example, returning to FIG. 8, communication component 804 of Wi-Fi client device 504 communicates with gateway 502 via Wi-Fi network 110.

At this point in time, from the perspective of gateway 502, returning to FIG. 6A, the redirection instruction has been transmitted (S622). Returning to FIG. 10, from the perspective of Wi-Fi client device 504, after communicating with the gateway (S1010), a redirection instruction is received (S1012). For example, as shown in FIG. 8, in an example of an embodiment, communication component 804 of Wi-Fi client device 504 receives the redirection instruction from gateway 502.

Returning to the perspective from Wi-Fi client device 504 illustrated by method 1000 of FIG. 10, after receiving a redirection instruction (S1012), it is again determined whether the gateway is detected (return to S1008). Accordingly, Wi-Fi client device 504 periodically checks for connection to gateway 502. As shown in FIG. 5, so long as Wi-Fi client device 504 detects gateway 502, Wi-Fi client 504 maintains communication with Internet 108 via Wi-Fi network 110.

However, returning to FIG. 10, if it is determined that a gateway is not detected (No at S1008), then it is determined whether a hotspot device is detected (S1014). For example, as shown in FIG. 8, in an example of an embodiment, when communication component 804 of Wi-Fi client device 504 loses communication with gateway 502 over Wi-Fi network 110, monitoring component 810 of Wi-Fi client device 504 monitors for available hotspots.

In this situation, Wi-Fi client device 504 does not detect gateway 502 and thus is not in communication with Internet 108 via Wi-Fi network 110. Therefore, in accordance with aspects of the present disclosure, Wi-Fi client device 504 will first search for available hotspots. Once found, Wi-Fi client device 504 will automatically redirect to a hotspot created by hotspot device as instructed in the redirection instruction that Wi-Fi client device 504 most recently received from gateway 502.

In this example, as shown in FIG. 5, Wi-Fi client device 504 is within hotspot 408 created by hotspot device 402, but is not within hotspot 512 created by hotspot device 510. Accordingly, Wi-Fi client device 504 is able detect hotspot 408.

Returning to FIG. 10, if it is determined that a hotspot device is not detected (No at S1014), then method 1000 stops (S1016). In this situation, Wi-Fi client device 504 does not detect gateway 502 and thus is not in communication with Internet 108 via Wi-Fi network 110. Unfortunately, Wi-Fi client device 504 has not detected any hotspots and thus will be unable to as instructed in the redirection instruction that Wi-Fi client device 504 most recently received from gateway 502.

However, if it is determined that a hotspot device is detected (Y at S1014), then the Wi-Fi client device is redirected to the hotspot device (S1018). For example, as shown in FIG. 8, in an example of an embodiment, monitoring component 810 of Wi-Fi client device 504 informs controller 806 of available hotspots. Controller 806 retrieves, from memory 802, the credentials associated with the hotspot device indicated in the most recently received redirection instruction. On-boarding component 808 then logs onto the detected hotspot device that is indicated in the most recently received redirection instruction.

Returning to the perspective from a hotspot device illustrated by method 1100 of FIG. 11, after connecting to the gateway (S1104), it is determined whether the hotspot functionality of the hotspot device is activated (S1106). For example, as shown in FIG. 9, controller 906 of hotspot device 402 determines whether the hotspot functionality has been activated. In some embodiments, hotspot functionality may be activated/deactivated by the user via UI component 908. In other embodiments, hotspot functionality may be activated/deactivated based on established predetermined parameters, non-limiting examples of which include location, time of day, etc.

Returning to FIG. 11, if it is determined that the hotspot functionality of the hotspot device is not activated (No at S1106), then method 1100 waits until the hotspot functionality of the hotspot device is activated (return to S1106). However, if it is determined that the hotspot functionality of the hotspot device has been activated (Yes at S1106), then it is determined whether a login signal has been received (S1108). For example, as shown in FIG. 9, communication component 904 of hotspot device 402 may receive a login signal from Wi-Fi client device 504.

Returning to FIG. 11, if it is determined that a login signal is received (Y at S1108) then the hotspot device connects to the Wi-Fi client device (S1110). For example, the received login signal will include the credentials of hotspot device 402, which were provided to Wi-Fi client device 504 by gateway 502 in the redirection instruction as discussed above. As shown in FIG. 9, on-boarding component 908 will then perform the required steps to connect Wi-Fi client device 504 to hotspot device 402 so that Wi-Fi client device 504 may communicate with Internet 108 by way of hotspot 408.

Returning to the perspective from Wi-Fi client device 504 illustrated by method 1000 of FIG. 10, after redirecting to a hotspot device (S1018), the Wi-Fi client device communicates via the hotspot device (S1020). For example, as shown in FIG. 13, Wi-Fi client device 504 has moved to a location outside of Wi-Fi network 110, but inside hot spot 508. Further, in this example, presume that the last received redirection instruction from gateway 502 indicated that Wi-Fi client device 504 should automatically connect to hotspot device 402. In this case, Wi-Fi client device 504 connects to hotspot device 402 so that Wi-Fi client device 504 may communicate with Internet 108 by way of hotspot 508.

Returning to the perspective from a hotspot device illustrated by method 1100 of FIG. 11, after connecting to the Wi-Fi client device (S1110), the hotspot device acts as hotspot (S1112). As mentioned above, at this point, Wi-Fi client device 504 may communicate with Internet 108 by way of hotspot 508.

Returning to FIG. 11, after the hotspot device acts as a hotspot (S1112), it is determined whether the hotspot functionality of the hotspot device is activated (S1114). This determination is performed in the same manner as discussed above (see S1106). If it is determined that the hotspot functionality of the hotspot device is still activated (Yes at S1114), it is then determined whether the hotspot device is connected to the Wi-Fi client device (S1116). For example, returning to FIG. 9, communication component 904 of hotspot device 402 will determine whether there is a connection between Wi-Fi client device 504 and hotspot device 402. If there is no connection between Wi-Fi client device 504, it is likely because Wi-Fi client device 504 has moved out of range of hotspot 408 of hotspot device 402, Wi-Fi client device 504 has reconnected with gateway 502 (see S1010 of FIG. 10) or Wi-Fi client device 504 has been turned off.

Returning FIG. 11, if it is determined that the hotspot device is connected to the Wi-Fi client device (Yes at S1116), then it is again determined whether the hotspot functionality of the hotspot device is activated (return to S1114). However, if it is determined that the hotspot device is not connected to the Wi-Fi client device (No at S1116), it is determined whether a login signal is received (return to S1108). Further, if it is determined that the hotspot functionality of the hotspot device is not activated (No at S1114), then method 1100 stops (S1118).

Returning to the perspective from Wi-Fi client device 504 illustrated by method 1000 of FIG. 10, after communicating via the hotspot device (S1020), the Wi-Fi client device periodically attempts to reconnect with the gateway (return to S1008).

At this point, Wi-Fi client device 504 is able to access Internet 108 via Wi-Fi network 110. Further, in the event Wi-Fi client device 504 move from Wi-Fi network 110, it still may be able to automatically access Internet 108 by way of hotspot device 402 or hotspot device 510. For purposes of discussion, in this example, let the redirection instruction from gateway 502 instruct Wi-Fi client device 504 to automatically connect to hotspot device 402 so as to have access to Internet 108 if Wi-Fi client device 504 loses communication with Wi-Fi network 110. This will be described in greater detail with reference to FIG. 13.

FIG. 13 illustrates wireless communication system 500, in accordance with aspects of the present disclosure at time $t_4$.

As shown in the figure, Wi-Fi client device 504 is disposed outside of network 110 of gateway 502, but is arranged to communicate with hotspot device 402 via a communication channel 1302. Further, hotspot device 402 is arranged to communicate with the Internet 108 via a communication channel 1304.

In accordance with aspects of the present disclosure, when Wi-Fi client device 504 left Wi-Fi network 110, Wi-Fi device 504 lost Wi-Fi communication with gateway 502, and therefore lost Wi-Fi communication with Internet 108. However, as a result of receiving a redirection instruction from gateway 502 prior to loosing Wi-Fi communication with gateway 502, Wi-Fi client device 504 knows to automatically connect to hotspot device 402. Further, because the redirection instruction from gateway 502 includes the login credentials of hotspot device 402, Wi-Fi client device 504 is able to automatically login to hotspot device 402 with the received login credentials without user interaction. As a result, to the user, there is such a quick automatic hand-off from Wi-Fi network 110 to hotspot 508, that Wi-Fi Internet connection is seamless.

Returning to the perspective from gateway 502 illustrated by method 600 of FIG. 6A, after the redirection instruction is transmitted (S622), it is determined whether a Wi-Fi client device location is changed (A to FIG. 6B, A to S624). Returning to FIG. 7, client location determining component 714 again determines the location of Wi-Fi client device 504 in the same manner as discussed above (see S618).

Returning to FIG. 6B, if it is determined that the Wi-Fi client device location has changed (Y at S624), then the location of the Wi-Fi client device is updated (S626). For example, as shown in FIG. 7, if the location of Wi-Fi client device 504 has changed, the new location of Wi-Fi client device 504 is updated in memory 702.

Returning to FIG. 6B, after the Wi-Fi client device location is updated (S626), an updated redirection instruction is generated (S628). In an example of an embodiment, as shown in FIG. 7, redirecting component 716 generates an updated redirection instruction using the updated Wi-Fi client device location (See S620 of FIG. 6A).

In general, gateway 502 updates the position of Wi-Fi client device 504 periodically, so that the redirection instruction is as up-to-date as possible. In this manner, in the event Wi-Fi client device 504 moves, the closest available hotspot device might change. This will be described in greater detail with reference to FIG. 14.

Figure 14:
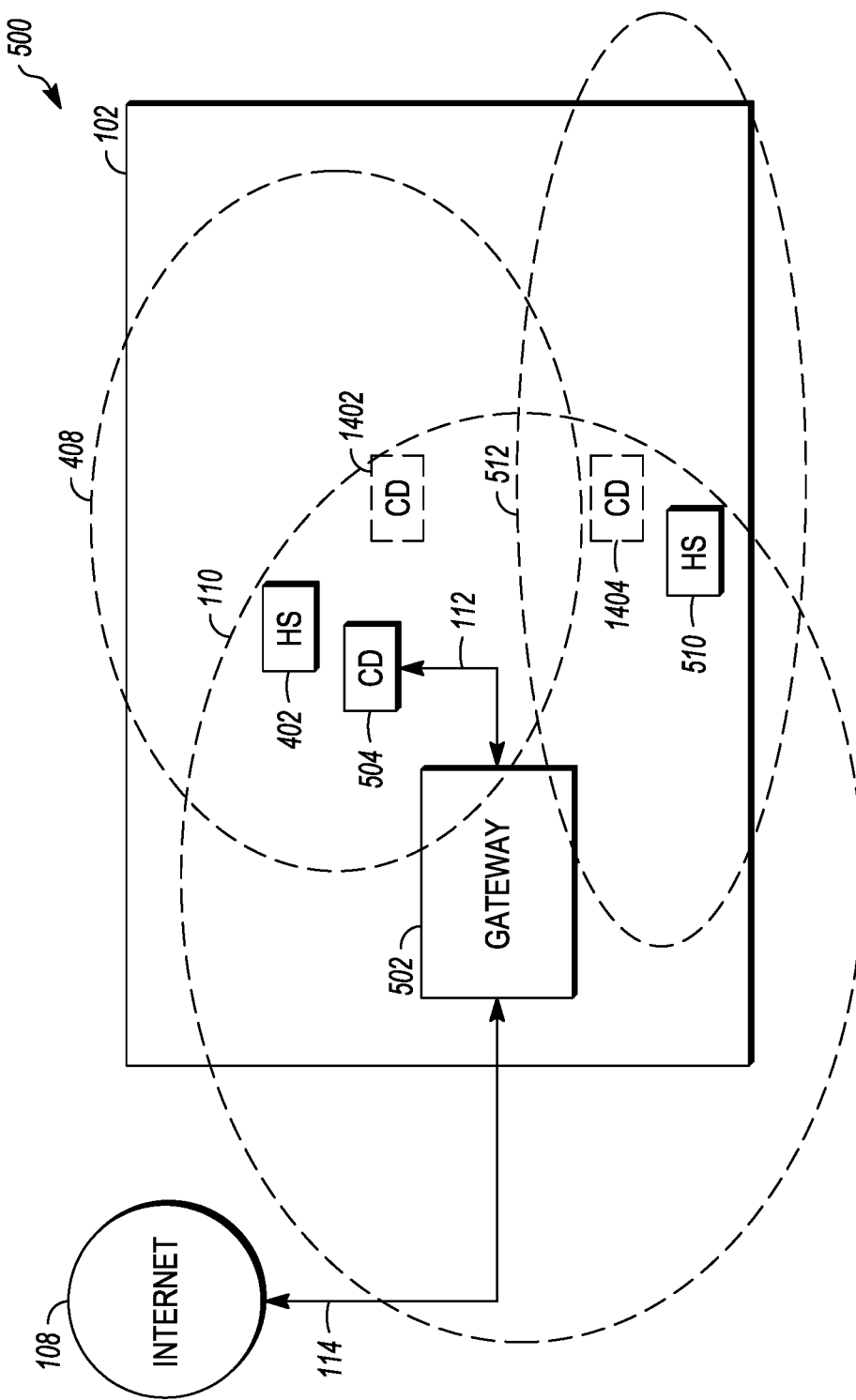
FIG. 14 illustrates the wireless communication system with hypothetical movements of a Wi-Fi client device.

FIG. 14 illustrates wireless communication system 500 with hypothetical movements of Wi-Fi client device 504.

As shown in the figure, suppose that after some time period $\Delta t$ after $t_3$, Wi-Fi client device 504 moves throughout house 102. For example, in one situation, Wi-Fi client device 504 moves to a position 1402, whereas in another situation, Wi-Fi client device 504 moves to a position 1404.

At position 1402, Wi-Fi client device 504 would still be closer to hotspot device 402 than to hotspot device 510. Accordingly, in this situation, gateway 502 would send the updated redirection instruction after period $\Delta t$ to instruct Wi-Fi client device 504 to redirect to hotspot device 402 in the event of loss of Wi-Fi communication with gateway 502.

Alternatively, at position 1404, Wi-Fi client device 504 would be closer to hotspot device 510 than to hotspot device 402. Accordingly, in this situation, gateway 502 would send the updated redirection instruction after period Δt to instruct Wi-Fi client device 504 to redirect to hotspot device 510 in the event of loss of Wi-Fi communication with gateway 502.

As the time period Δt becomes smaller, the updated redirection instruction becomes more likely to redirect Wi-Fi client device 504 to the available hotspot device that is best suited for a seamless hand-off.

Returning to FIG. 6B, if it is determined that the Wi-Fi client device location has not changed (N at S624), then it is determined whether the location of any of the hotspot devices have changed (S630). For example, returning to FIG. 7, Wi-Fi hotspot location determining component 710 again determines the location of Wi-Fi hotspot device 402 and the location of Wi-Fi hotspot device 510 in the same manner as discussed above (see S612).

Returning to FIG. 6B, if it is determined that the location of either of Wi-Fi hotspot device 402 or Wi-Fi hotspot device 510 has changed (Y at S630), then the location of the Wi-Fi hotspot device, or devices, that have changed is updated (S632). For example, as shown in FIG. 7, if the location of Wi-Fi hotspot device 402 has changed, the new location of Wi-Fi hotspot device 402 is updated in memory 702.

Returning to FIG. 6B, after the Wi-Fi hotspot device location is updated (S632), an updated redirection instruction is generated (S634). In an example of an embodiment, as shown in FIG. 7, redirecting component 716 generates an updated redirection instruction using the updated Wi-Fi hotspot device location (See S620 of FIG. 6A).

In general, gateway 502 updates the position of connected available hotspot devices periodically, so that the redirection instruction is as up-to-date as possible. In this manner, in the event an available hotspot device moves, the closest available hotspot device for Wi-Fi client device 504 might change. This will be described in greater detail with reference to FIG. 15.

Figure 15:
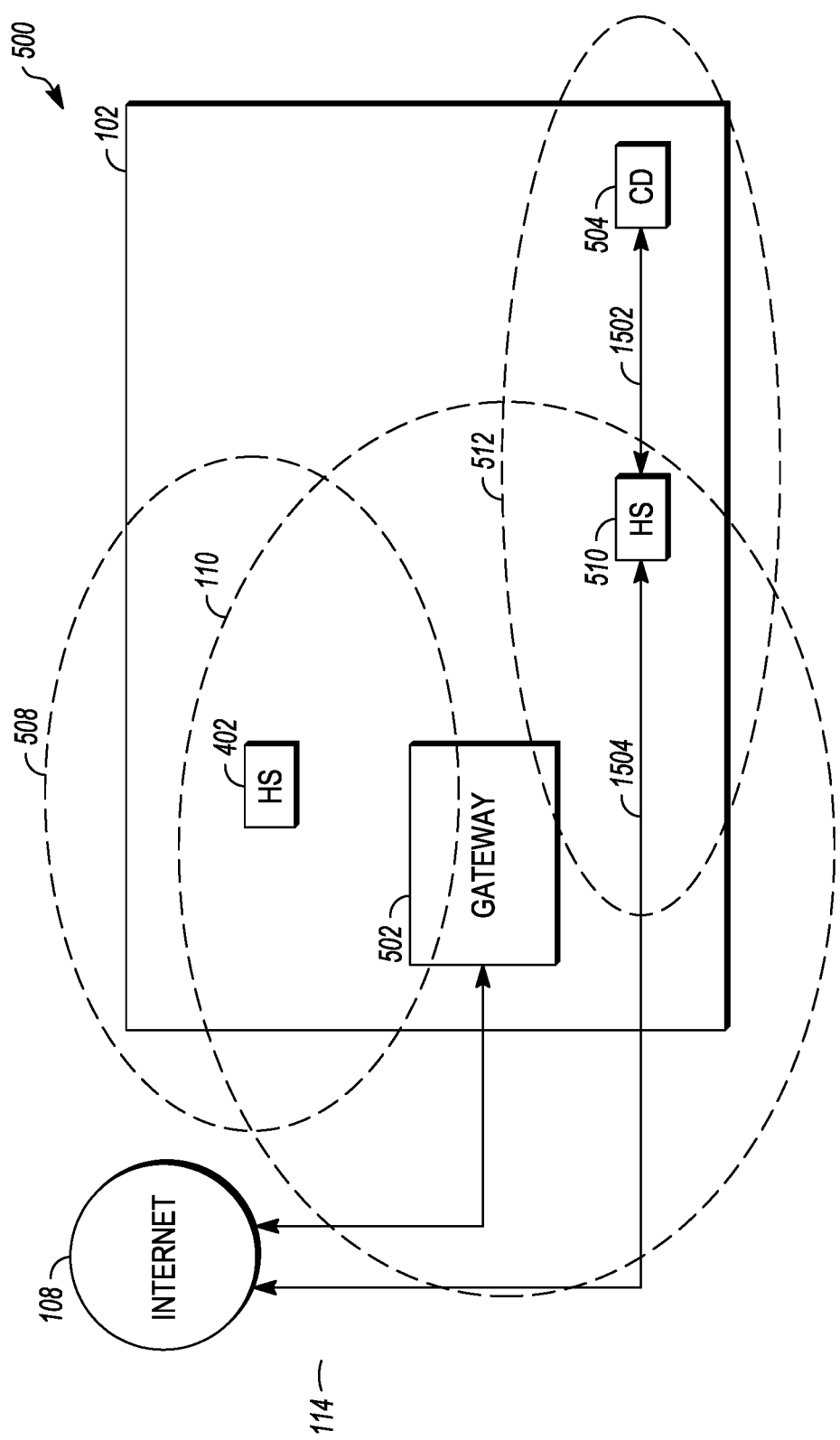
FIG. 15 illustrates the wireless communication system of FIG. 0.5, in accordance with aspects of the present disclosure at time $t_5$.

FIG. 15 illustrates wireless communication system 500, in accordance with aspects of the present disclosure at time $t_5$.

As shown in the figure, Wi-Fi client device 504 is disposed outside of network 110 of gateway 502, but is arranged to communicate with hotspot device 510 via a communication channel 1502. Further, hotspot device 510 is arranged to communicate with the Internet 108 via a communication channel 1504.

As shown in the figure, suppose that at time $t_5$, after some time period δt after $t_3$, Wi-Fi client device 504 moves throughout house 102, out of Wi-Fi network 110, but remains in hotspot 512, and hotspot device 402 moves to a new location.

In this situation, not only has Wi-Fi client device 504 moved, but so has hotspot device 402. In this situation, Wi-Fi client device 504 would now closer to hotspot device 510 and is not even within hotspot 508 of hotspot device 402. Accordingly, in this situation, gateway 502 would send the updated redirection instruction after period δt to instruct Wi-Fi client device 504 to redirect to hotspot device 510 in the event of loss of Wi-Fi communication with gateway 502.

As the time period δt becomes smaller, the updated redirection instruction becomes more likely to redirect Wi-Fi client device 504 to the available hotspot device that is best suited for a seamless hand-off.

It should be noted that in some embodiments the period Δt for gateway 502 to update the location of Wi-Fi client device 504 and the period δt for gateway 502 to update the location of available hotspot devices is different. However, in other embodiments, the period Δt for gateway 502 to update the location of Wi-Fi client device 504 and the period δt for gateway 502 to update the location of available hotspot devices are the same.

More generally, returning to FIG. 7, the redirection factors used by redirecting component 716 that are stored in memory 702 and that are used to determine redirection instructions for each Wi-Fi client device, and periodically updated. This is reflected by examples as discussed in more detail with reference to FIG. 12B.

Returning to FIG. 12B, in this example, at time $t_5$, as shown in column 1204, CD A has: a 6.6 redirection factor with reference to HS A in row 1212; a 1.2 redirection factor with reference to HS B in row 1214; and a 2.9 redirection factor with reference to HS C in row 1216. In this case, the 6.6 redirection factor, as indicated by dotted ellipse 1224, is the largest redirection factor for CD A in lookup table 1200 at time $t_5$. Therefore the gateway would generate a redirection instruction so as to instruct a CD A to redirect to HS A.

As shown in column 1206, CD B has: a 5.6 redirection factor with reference to HS A in row 1212; a 7.1 redirection factor with reference to HS B in row 1214; and a 0.0 redirection factor with reference to HS C in row 1216. In this case, the 7.1 redirection factor, as indicated by dotted ellipse 1226, is the largest redirection factor for CD B in lookup table 1200 at time $t_5$. Therefore the gateway would generate a redirection instruction so as to instruct a CD B to redirect to HS B.

As shown in column 1208, CD C has: a 1.4 redirection factor with reference to HS A in row 1212; a 4.8 redirection factor with reference to HS B in row 1214; and a 6.8 redirection factor with reference to HS C in row 1216. In this case, the 6.8 redirection factor, as indicated by dotted ellipse 1228, is the largest redirection factor for CD C in lookup table 1200 at time $t_5$. Therefore the gateway would generate a redirection instruction so as to instruct a CD C to redirect to HS C.

Returning to FIG. 6B, after the updated redirection instruction is generated (S634), the redirection instruction is transmitted (S636). For example, as shown in FIG. 5, gateway 502 transmits the redirection instruction in a manner as discussed above (see S622). In this case, both Wi-Fi client device 504 and at least one of hotspot device 402 and hotspot device 510 have moved. As such, the newly transmitted redirection instruction will reflect the most updated locations of Wi-Fi client device 504, hotspot device 402 and hotspot device 510.

Returning to FIG. 6B, if it is determined that the hotspot device location is not changed (No at S630), then the redirection instruction is transmitted (S636). For example, as shown in FIG. 5, gateway 502 transmits the redirection instruction in a manner as discussed above (see S622). In this case however, while Wi-Fi client device 504 has moved, neither of hotspot device 402 or hotspot device 510 have moved. As such, the newly transmitted redirection instruction will reflect the most updated locations of Wi-Fi client device 504.

Returning to FIG. 6B, after the redirection instruction is transmitted (S636), method 600 stops (S638).

Benefits of a system and method in accordance with aspects of the present disclosure include: an automated way to determine that a Wi-Fi client does not have enough bandwidth to access the Internet using the Wi-Fi router, or gateway having router capabilities: the ability to pre-configure the feature mode to either determine which nearby device hotspot to use for redirection or always redirect to a specific device hotspot; an automated way to sense the position of the Wi-Fi client and a near-by device hotspot within the consumer's premises; an automated way to redirect the Wi-Fi client to connect to the near-by device hotspot for Internet access and an automated reconfiguration of the device Hotspot SSID and password to use the SSID and password of the router, or gateway having router capabilities, when using the near-by device hotspot for Internet access. This last benefit makes the feature transparent to the user of the Wi-Fi client device and allows the device hotspot to become an extension of the Wi-Fi network of the router, or gateway having router capabilities.

The foregoing description of various preferred embodiments have been presented for purposes of illustration and description. It is not intended to be exhaustive or to limit the invention to the precise forms disclosed, and obviously many modifications and variations are possible in light of the above teaching. The examples of embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wireless network gateway for redirecting a wireless client device to a wireless network hotspot device, the wireless network gateway comprising:
    a wireless network component, operable to generate a wireless network;
    a network connection component operable to connect the wireless client device to an access point (AP) of the wireless network;
    a registration component, operable to register the wireless network hotspot device by receiving and storing wireless network hotspot device login information from the wireless network hotspot device that enables connection with the wireless network hotspot device;
    a hotspot location determining component, operable to determine a location of the wireless network hotspot device;
    a client location determining component, operable to determine a location of the wireless client device;
    a redirecting component, operable to generate continuously redirection instructions based on the location of the wireless network hotspot device and the location of the wireless client device, wherein the redirection instructions include the hotspot device internal SSID and Password information to enable the wireless client device to automatically switch between the AP and the wireless network hotspot device without any updates to the wireless client device current SSID; and
    a communication component, operable to transmit a first redirection instruction to the wireless client device prior to losing a connection with the AP to instruct the wireless client device to redirect the connection from the AP to the wireless network hotspot device, and operable to periodically transmit a second redirection instruction to the wireless client device prior to losing the connection with the wireless network hotspot device to instruct the wireless client device to redirect the connection from the wireless network hotspot device back to the AP when the connection to the AP becomes available.

2. The wireless network gateway of claim 1,
    wherein the hotspot location determining component is further operable to update the location of the wireless network hotspot device at predetermined first intervals, and
    wherein the redirecting component is further operable to generate the redirection instruction based on the location of the wireless client device and a most recent location of the wireless network hotspot device as determined via the hotspot location determining component.

3. The wireless network gateway of claim 2,
    wherein the client location determining component is further operable to update the location of the wireless client device at predetermined second intervals, and
    wherein the redirecting component is operable to generate the redirection instruction based on a most recent location of the wireless client device as determined via the client location determining component and the most recent location of the wireless network hotspot device as determined via the hotspot location determining component.

4. The wireless network gateway of claim 1,
    wherein the client location determining component is further operable to update the location of the wireless client device at predetermined second intervals, and
    wherein the redirecting component is operable to generate the redirection instruction based on a most recent location of the wireless client device as determined via the client location determining component and the most recent location of the wireless network hotspot device as determined via the hotspot location determining component.

5. A method of redirecting a wireless client device to a wireless network hotspot device, the method comprising:
    generating, via a wireless network component, a wireless network;
    connecting, via a network connection component, the wireless client device to an access point (AP) of the wireless network;
    registering, via a registration component, the wireless network hotspot device by receiving and storing wireless network hotspot device login information from the wireless network hotspot device that enables connection with the wireless network hotspot device;
    determining, via a hotspot location determining component, a location of the wireless network hotspot device;
    determining, via a client location determining component, a location of the wireless client device;
    generating continuously, via a redirecting component, redirection instructions based on the location of the wireless network hotspot device and the location of the wireless client device, wherein the redirection instructions include the hotspot device internal SSID and Password information to enable the wireless client device to automatically switch between the AP and the wireless network hotspot device without any updates to the wireless client device current SSID;
    transmitting, via a communication component, a first redirection instruction to the wireless client device prior to losing a connection with the AP to instruct the wireless client device to redirect the connection from the AP to the wireless network hotspot device; and
    transmitting periodically a second redirection instruction to the wireless client device prior to losing the connection with the wireless network hotspot device to instruct the wireless client device to redirect the connection from the wireless network hotspot device back to the AP when the connection to the AP becomes available.

6. The method of claim 5, further comprising:
updating, via the hotspot location determining component, the location of the wireless network hotspot device at predetermined first intervals,
wherein the generating comprises generating, via the redirecting component, the redirection instruction based on the location of the wireless client device and a most recent location of the wireless network hotspot device as determined via the hotspot location determining component.

7. The method of claim 6, further comprising:
updating, via the client location determining component, the location of the wireless client device at predetermined second intervals,
wherein the generating comprises generating, via the redirecting component, the redirection instruction based on a most recent location of the wireless client device as determined via the client location determining component and the most recent location of the wireless network hotspot device as determined via the hotspot location determining component.

8. The method of claim 5, further comprising:
updating, via the client location determining component, the location of the wireless client device at predetermined second intervals,
wherein the generating comprises generating, via the redirecting component, the redirection instruction based on a most recent location of the wireless client device as determined via the client location determining component.

9. A non-transitory, tangible, computer-readable medium storing computer-readable instructions that, when executed by one or more computer processors, cause the one or more computer processors to perform at least the following:
generating, via a wireless network component, a wireless network;
connecting, via a network connection component, the wireless client device to an access point (AP) of the wireless network;
registering, via a registration component, the wireless network hotspot device by receiving and storing wireless network hotspot device login information from the wireless network hotspot device that enables connection with the wireless network hotspot device;
determining, via a hotspot location determining component, a location of the wireless network hotspot device;
determining, via a client location determining component, a location of the wireless client device;
generating continuously, via a redirecting component, redirection instructions based on the location of the wireless network hotspot device and the location of the wireless client device, wherein the redirection instructions include the hotspot device internal SSID and Password information to enable the wireless client device to automatically switch between the AP and the wireless network hotspot device updates to the wireless client device current SSID; and
transmitting, via a communication component, a first redirection instruction to the wireless client device prior to losing a connection to with AP to instruct the wireless client device to redirect the connection from the AP to the wireless network hotspot device; and
transmitting periodically a second redirection instruction to the wireless client device prior to losing the connection with the wireless network hotspot device to instruct the wireless client device to redirect the connection from the wireless network hotspot device back to the AP when the connection to the AP becomes available.

10. The non-transitory, tangible, computer-readable medium of claim 9, wherein the computer-readable instructions cause the one or more computer processors to further perform at least the following:
updating, via the hotspot location determining component, the location of the wireless network hotspot device at predetermined first intervals,
wherein the generating comprises generating, via the redirecting component, the redirection instruction based on the location of the wireless client device and a most recent location of the wireless network hotspot device as determined via the hotspot location determining component.

11. The non-transitory, tangible, computer-readable medium of claim 10, wherein the computer-readable instructions cause the one or more computer processors to further perform at least the following:
updating, via the client location determining component, the location of the wireless client device at predetermined second intervals,
wherein the generating comprises generating, via the redirecting component, the redirection instruction based on a most recent location of the wireless client device as determined via the client location determining component and the most recent location of the wireless network hotspot device as determined via the hotspot location determining component.

12. The non-transitory, tangible, computer-readable medium of claim 9, wherein the computer-readable instructions cause the one or more computer processors to further perform at least the following:
updating, via the client location determining component, the location of the wireless client device at predetermined second intervals,
wherein the generating comprises generating, via the redirecting component, the redirection instruction based on a most recent location of the wireless client device as determined via the client location determining component and the most recent location of the wireless network hotspot device as determined via the hotspot location determining component.

13. A wireless client device for communicating with a wireless network gateway and a wireless network hotspot device,
the wireless network gateway being operable to create a wireless network to enable the wireless client device to communicate with the Internet via an access point (AP) of the wireless network when the wireless client device is in connection with the wireless network;
the wireless network hotspot device being operable to create a wireless network hotspot to enable the wireless client device to communicate with the Internet via the wireless network
hotspot when the wireless client device is in connection with the wireless network hotspot; the wireless network gateway including: a wireless network component, operable to generate a wireless network; a network connection component operable to connect the wireless client device to the AP of the wireless network; a registration component, operable to register the wireless network hotspot device by receiving and storing wireless network hotspot device login information from the wireless network hotspot device that enables connection with the wireless network hotspot device; a hotspot location determining component operable to determine a location of the wireless network hotspot device; a client location determining component operable to determine a location of the wireless client device; a redirecting component operable to generate continuously redirection instructions based on the location of the wireless network hotspot device and the location of the wireless client device; and a communication component operable to transmit a first redirection instruction to the wireless client device prior to losing a connection with the AP to instruct the wireless client device to redirect the connection from the AP to the wireless network hotspot device, and operable to periodically transmit a second redirection instruction to the wireless client device prior to losing the connection with the wireless network hotspot device to instruct the wireless client device to redirect the connection from the wireless network hotspot device back to the AP when the connection to the AP becomes available;

the wireless client device comprising:

a client device communication component, operable to wirelessly communicate with the wireless network gateway via the AP of the wireless network, to wirelessly communicate with the wireless network hotspot device via the wireless network hotspot and to receive the redirection instructions from the wireless network gateway, wherein the redirection instructions include the hotspot device internal SSID and Password information to enable the wireless client device to automatically switch between the AP and the wireless network hotspot device without any updates to the wireless client device current SSID;

an on-boarding component, operable to login to the wireless network hotspot device based on the redirection instructions when a wireless connection between the client device communication component and the wireless network gateway via the AP of the wireless network is below a predetermined parameter level; and a monitoring component, operable to detect when the wireless connection between the client device communication component and the wireless network gateway via the AP of the wireless network is above the predetermined parameter level after the on-boarding component logs into the wireless network hotspot device based on the redirection instructions when the wireless connection between the client device communication component and the wireless network gateway via the AP of the wireless network is below the predetermined parameter level; and wherein the on-boarding component is further operable to login to the wireless network gateway via the AP of wireless network when the monitoring component detects that the connection between the client device communication component and the wireless network gateway via the wireless network is above the predetermined parameter level and after the on-boarding component has logged into the wireless network hotspot device based on the redirection instructions.

* * * * *